(12) United States Patent
Xu et al.

(10) Patent No.: US 9,398,589 B2
(45) Date of Patent: Jul. 19, 2016

(54) METHOD FOR RESOURCE ASSIGNMENT, BASE STATION AND TERMINAL EQUIPMENT

(71) Applicant: FUJITSU LIMITED, Kawasaki-shi, Kanagawa (JP)

(72) Inventors: Haibo Xu, Beijing (CN); Yanling Lu, Beijing (CN); Yuantao Zhang, Beijing (CN); Yi Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 14/175,558

(22) Filed: Feb. 7, 2014

(65) Prior Publication Data

US 2014/0153524 A1    Jun. 5, 2014

Related U.S. Application Data

(63) Continuation of application No. PCT/CN2011/078489, filed on Aug. 16, 2011.

(51) Int. Cl.
| | |
|---|---|
| H04W 4/00 | (2009.01) |
| H04W 72/04 | (2009.01) |
| H04L 5/00 | (2006.01) |
| H04W 24/02 | (2009.01) |

(52) U.S. Cl.
CPC ......... *H04W 72/0453* (2013.01); *H04L 5/0044* (2013.01); *H04L 5/0076* (2013.01); *H04L 5/0094* (2013.01); *H04W 24/02* (2013.01); *H04L 5/001* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2012/0087331 A1 | 4/2012 | Seo et al. | |
| 2012/0140726 A1 | 6/2012 | Moon et al. | |
| 2012/0257590 A1 | 10/2012 | Ishii et al. | |
| 2013/0176952 A1* | 7/2013 | Shin | H04L 5/001 370/329 |

FOREIGN PATENT DOCUMENTS

| | | |
|---|---|---|
| CN | 101222312 | 7/2008 |
| CN | 101399800 | 4/2009 |
| CN | 101765208 A | 6/2010 |
| CN | 101778393 | 7/2010 |
| CN | 102036387 | 4/2011 |
| EP | 2 439 995 A2 | 4/2012 |
| JP | 2011-504322 A | 2/2011 |

(Continued)

OTHER PUBLICATIONS (LTE; Evolved Universal Terrestrial Radio Access (E-UTRA); Physical layer procedures; 3GPP TS 36.213 version 10.2.0 Release 10; Jun. 2011).*

(Continued)

*Primary Examiner* — Afshawn Towfighi
(74) *Attorney, Agent, or Firm* — Myers Wolin, LLC.

(57) ABSTRACT

A method for resource assignment, base station and terminal equipment. The method includes: determining resource block group sizes or numbers of resource block subsets to which a stand-alone carrier and a carrier segment correspond; and assigning a resource to terminal equipment according to the resource block group sizes or the numbers of the resource block subsets. With this method, waste of RBs in the resource assignment type 0 may be avoided on the one hand, and on the other hand, a solution for resource assignment of the resource assignment type 1 is provided.

20 Claims, 12 Drawing Sheets

| Resource assignment type (type) | Bitmap of resource assignment (Bitmap) |
|---|---|

(56) References Cited

FOREIGN PATENT DOCUMENTS

| | | | |
|---|---|---|---|
| JP | 2011-135234 | A | 7/2011 |
| KR | 10-2010-0130154 | A | 12/2010 |
| KR | 10-2011-0014101 | A | 2/2011 |
| WO | 2009/088201 | A2 | 7/2009 |
| WO | 2010/140828 | A2 | 12/2010 |
| WO | 2011/047353 | A1 | 4/2011 |
| WO | 2011/084822 | A1 | 7/2011 |
| WO | 2011084822 | | 7/2011 |

OTHER PUBLICATIONS

Office Action issued by the Japan Patent Office for corresponding Japanese Patent Application No. 2014-525277, mailed on Aug. 18, 2015, with an English translation.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)", Mar. 2011.
International search report issued for corresponding international application No. PCT/CN2011/078489, mailed May 24, 2012.
3GPP TS 36.213 V9.3.0; 3rd Generation Partnership Project; Technical Specification Group Radio Access Network; Evolved Universal Terrestrial Radio Access (E-UTRA); "Physical layer procedures (Release 9)"; Sep. 2010.
Extended European search report with supplementary European search report and the European search opinion issued for corresponding European Patent Application No. 11870854.4, mailed on Mar. 6, 2015.
Notice of Preliminary Rejection issued for corresponding Korean Patent Application No. 10-2014-7005839, mailed on Mar. 31, 2015, with English translation.
Qualcomm Europe, "Resource allocation header for DL assignments", Agenda Item: 6.1.3, 3GPP TSG-RAN WG1 Meeting #52, R1-080643, Sorrento, Italy, Feb. 11-15, 2008.
Notice of Final Rejection issued by the Korean Intellectual Property Office for corresponding Korean Patent Application No. 10-2014-7005839, mailed on Nov. 27, 2015, with English translation.
Notice of Preliminary Rejection issued by the Korean Intellectual Property Office for corresponding Korean Patent Application No. 10-2016-7005579, mailed on Mar. 29, 2016, with English translation.
First Notification of Office Action issued by the State Intellectual Property Office of China for corresponding Chinese Patent Application No. 201180070927.7, dated May 5, 2016, with an English translation.

* cited by examiner

| Resource assignment type (type) | Bitmap of resource assignment (Bitmap) |
Fig.1
Fig.2A
| 0 | 1100011010100 |
Fig.2B
| Resource assignment type (Type) | Resource block subset ID (Subset) | Bit for resource assignment correspond from the left side/right side (L/R) | Bitmap of resource assignment (Bitmap) |
Fig.3
Fig.4A
| 1 | 0 | 0 | 11000110101 |
Fig.4B

| Resource assignment type (Type) | Bitmap of resource assignment of a stand-alone carrier (bitmap) | Bitmap of resource assignment of a carrier segment (bitmap) |

Fig.7A

| Resource assignment type of a stand-alone carrier (Type) | Bitmap of resource assignment of a stand-alone carrier (bitmap) | Resource assignment type of a carrier segment (Type) | Bitmap of resource assignment of a carrier segment (bitmap) |

Fig.7B

| Resource assignment type of a stand-alone carrier (Type) | Resource assignment type of a carrier segment (Type) | Bitmap of resource assignment of a stand-alone carrier (bitmap) | Bitmap of resource assignment of a carrier segment (bitmap) |

Fig.7C

| Resource assignment type (Type) | Bitmap of resource assignment of carrier segment 1 (bitmap) | Bitmap of resource assignment of a stand-alone carrier (bitmap) | Bitmap of resource assignment of carrier segment 2 (bitmap) |

Fig.8A

| Resource assignment type of carrier segment 1 (Type) | Bitmap of resource assignment of carrier segment 1 (bitmap) | Resource assignment type of a stand-alone carrier (Type) | Bitmap of resource assignment of a stand-alone carrier (bitmap) | Resource assignment type of carrier segment 2 (Type) | Bitmap of resource assignment of carrier segment 2 (bitmap) |

Fig.8B

| Resource assignment type of carrier segment 1 (Type) | Resource assignment type of a stand-alone carrier (Type) | Resource assignment type of carrier segment 2 (Type) | Bitmap of resource assignment of carrier segment 1 (bitmap) | Bitmap of resource assignment of a stand-alone carrier (bitmap) | Bitmap of resource assignment of carrier segment 2 (bitmap) |
|---|---|---|---|---|---|

Fig.8C

| Resource assignment type (Type) | Resource block subset of a stand-alone carrier (subset) | L/R | Bitmap of resource assignment of a stand-alone carrier (bitmap) | Resource block subset of a carrier segment (subset) | Bitmap of resource assignment of a carrier segment (bitmap) |
|---|---|---|---|---|---|

Fig.9A

| Resource assignment type (Type) | Resource block subset of a stand-alone carrier (subset) | Resource block subset of a carrier segment (subset) | L/R | Bitmap of resource assignment of a stand-alone carrier (bitmap) | Bitmap of resource assignment of a carrier segment (bitmap) |
|---|---|---|---|---|---|

Fig.9B

| Resource assignment type (Type) | Resource block subset of a stand-alone carrier (subset) | L/R of a stand-alone carrier | Bitmap of resource assignment of a stand-alone carrier (bitmap) | Resource block subset of a carrier segment (subset) | L/R of a carrier segment | Bitmap of resource assignment of a carrier segment (bitmap) |
|---|---|---|---|---|---|---|

Fig.9C

| Resource assignment type (Type) | Resource block subset of a stand-alone carrier (subset) | L/R of a stand-alone carrier | Resource block subset of a carrier segment (subset) | L/R of a carrier segment | Bitmap of resource assignment of a stand-alone carrier (bitmap) | Bitmap of resource assignment of a carrier segment (bitmap) |
|---|---|---|---|---|---|---|

Fig.9D

| Resource assignment type (Type) | Resource block subset of a stand-alone carrier (subset) | Resource block subset of a carrier segment (subset) | L/R of a stand-alone carrier | L/R of a carrier segment | Bitmap of resource assignment of a stand-alone carrier (bitmap) | Bitmap of resource assignment of a carrier segment (bitmap) |
|---|---|---|---|---|---|---|

Fig.9E

| Resource assignment type (Type) | L/R | Resource block subset of carrier segment 1 (subset) | Bitmap of resource assignment of carrier segment 1 (bitmap) | Resource block subset of a stand-alone carrier (subset) | Bitmap of resource assignment of a stand-alone carrier (bitmap) | Resource block subset of carrier segment 2 (subset) | Bitmap of resource assignment of carrier segment 2 (bitmap) |
|---|---|---|---|---|---|---|---|

Fig.10A

| Resource assignment type (Type) | Resource block subset of carrier segment 1 (subset) | Resource block subset of a stand-alone carrier (subset) | Resource block subset of carrier segment 2 (subset) | L/R | Bitmap of resource assignment of carrier segment 1 (bitmap) | Bitmap of resource assignment of a stand-alone carrier (bitmap) | Bitmap of resource assignment of carrier segment 2 (bitmap) |
|---|---|---|---|---|---|---|---|

Fig.10B

| Resource assignment type (Type) | Resource block subset of carrier segment 1 (subset) | L/R of carrier segment 1 | Bitmap of resource assignment of carrier segment 1 (bitmap) | Resource block subset of a stand-alone carrier (subset) | L/R of a stand-alone carrier | Bitmap of resource assignment of a stand-alone carrier (bitmap) | Resource block subset of carrier segment 2 (subset) | L/R of carrier segment 2 | Bitmap of resource assignment of carrier segment 2 (bitmap) |
|---|---|---|---|---|---|---|---|---|---|

Fig.10C

| Resource assignment type (Type) | Resource block subset of carrier segment 1 (subset) | L/R of carrier segment 1 | Bitmap of resource assignment of carrier segment 1 (bitmap) | Resource block subset of a stand-alone carrier (subset) | L/R of a stand-alone carrier | Bitmap of resource assignment of a stand-alone carrier (bitmap) | Resource block subset of carrier segment 2 (subset) | L/R of carrier segment 2 | Bitmap of resource assignment of carrier segment 2 (bitmap) |
|---|---|---|---|---|---|---|---|---|---|

Fig.10D

| Resource assignment type (Type) | Resource block subset of carrier segment 1 (subset) | Resource block subset of a stand-alone carrier (subset) | Resource block subset of carrier segment 2 (subset) | L/R of carrier segment 1 | L/R of a stand-alone carrier | L/R of carrier segment 2 | Bitmap of resource assignment of carrier segment 1 (bitmap) | Bitmap of resource assignment of a stand-alone carrier (bitmap) | Bitmap of resource assignment of carrier segment 2 (bitmap) |
|---|---|---|---|---|---|---|---|---|---|

Fig.10E

| Resource assignment type (Type) | Resource block subset (subset) | L/R | Bitmaps of resource assignment of a stand-alone carrier and a carrier segment (bitmap) |

Fig.14

| Resource assignment type (Type) | Resource block subset (subset) | L/R | Bitmaps of resource assignment of carrier segment 1 and a stand-alone carrier and carrier segment 2 (bitmap) |

Fig.15

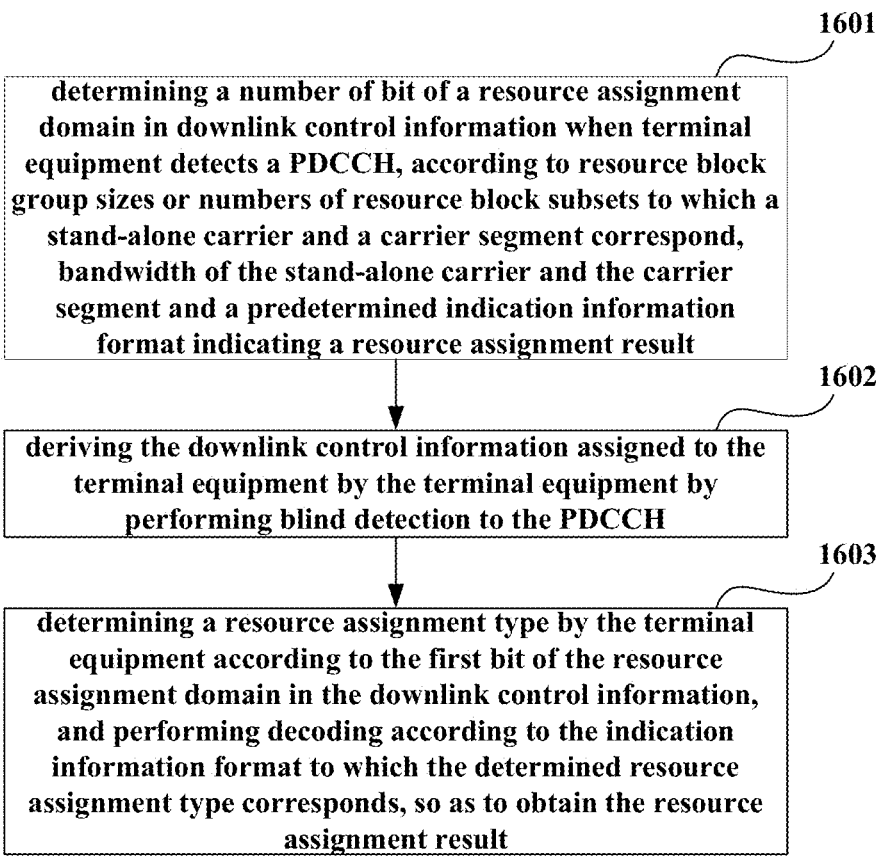

1601 — determining a number of bit of a resource assignment domain in downlink control information when terminal equipment detects a PDCCH, according to resource block group sizes or numbers of resource block subsets to which a stand-alone carrier and a carrier segment correspond, bandwidth of the stand-alone carrier and the carrier segment and a predetermined indication information format indicating a resource assignment result 1602 — deriving the downlink control information assigned to the terminal equipment by the terminal equipment by performing blind detection to the PDCCH 1603 — determining a resource assignment type by the terminal equipment according to the first bit of the resource assignment domain in the downlink control information, and performing decoding according to the indication information format to which the determined resource assignment type corresponds, so as to obtain the resource assignment result

Fig.16

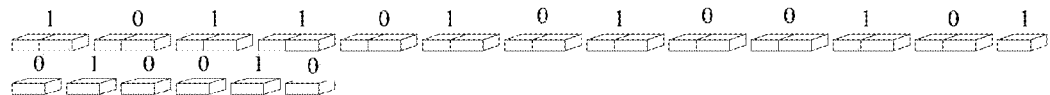
Fig.18A
| 0 | 1011010100101 | 010010 |
Fig.18B
| 0 | 1011010100101 | 0 | 010010 |
Fig.18C
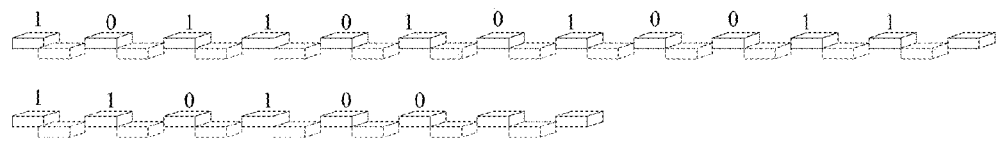
Fig.19A
| 0 | 0 | 0 | 101101010011 | 110100 |
Fig.19B
| 1 | 0 | 0 | 0 | 101101010011 | 110100 |
Fig.19C

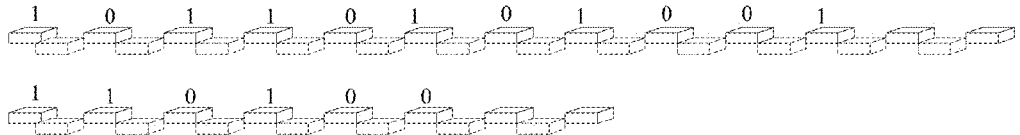
Fig.20A
| 1 | 0 | 1 | 10110101001 | 0 | 0 | 110100 |
Fig.20B
| 1 | 0 | 1 | 0 | 0 | 10110101001 | 110100 |
Fig.20C
| 1 | 0 | 0 | 1 | 0 | 10110101001 | 110100 |
Fig.20D
Fig.21A
| 0 | 1011010100101100 |
Fig.21B

METHOD FOR RESOURCE ASSIGNMENT, BASE STATION AND TERMINAL EQUIPMENT

CROSS-REFERENCE TO RELATED APPLICATIONS

This is a continuation of International Application No. PCT/CN2011/078489, filed on Aug. 16, 2011, the contents of which are herein wholly incorporated by reference.

TECHNICAL FIELD

The present invention relates to the field of communications, and in particular to a method for resource assignment, base station and terminal equipment.

BACKGROUND ART

In order to satisfy the requirements of a high data rate, a carrier aggregation technology has been proposed in a long-term evolution-advanced (LTE-A) system, so as to be able to provide bandwidth values required by the high data rate. In the carrier aggregation technology, each aggregated carrier is referred to as a component carrier (CC).

In Rel-10 of an LTE-A system, the types of carriers comprise backward compatible carriers and non-backward compatible carriers. The backward compatible carriers may be accessed by a terminal in Rel-10, and may be accessed by terminals in Rel-8 and Rel-9. While the non-backward compatible carriers may be accessed by a terminal in Rel-10 after configuration, and cannot be accessed by terminals in Rel-8 and Rel-9. Wherein, the non-backward compatible carriers comprise extension carriers and carrier segments. Such two types of carriers cannot operate independently, and need the backward compatible carriers to coordinate in operation. The backward compatible carriers are hereinafter referred to as stand-alone carriers.

In an LTE system, three methods for downlink resource assignment are defined, that is, resource assignment type 0, resource assignment type 1 and resource assignment type 2 (refer to 3GPP TS36.213 v9.3.0).

In resource assignment type 0, a resource block group (RBG) consists of several consecutive resource blocks (RBs). In assigning resources by a base station for a terminal, an RBG is taken as a minimum assignment unit, that is, it decides whether to assign a certain RBG to the terminal. Wherein, the RGB size is determined according to the system bandwidth. After obtaining a resource assignment result, the base station will notify the terminal of the result via a resource assignment (RA) domain in a downlink resource assignment indicator (DCI).

However, in the implementation of the present invention, the inventors found that there exist a terminal of Rel-8/9/10 and a terminal of Rel-11 under the coverage of a base station at the same time. In a case where the base station is configured with a stand-alone carrier and a carrier segment at the same time, the stand-alone carrier allows terminals of all types to be accessed, while the carrier segment can only be configured for a terminal of Rel-11, and is after the terminal of Rel-11 accesses to a stand-alone carrier. Hence, a case will occur where the system bandwidths of the terminal of Rel-8/9/10 and the terminal of Rel-11 are different.

For example, the base station has a spectrum of a bandwidth of 32 RBs, among which the bandwidth of a stand-alone carrier is 25 RBs, and 6 RBs may be used as carrier segments. All the terminals may access to a stand-alone carrier of a system bandwidth of 25 RBs. After a terminal of Rel-11 accesses to the stand-alone carrier, the base station may configure the terminal with carriers segments of 6 RBs after the base station learns that the version of the terminal is Rel-11. In this way, the system bandwidth of the terminal of Rel-11 is 31 RBs, while the system bandwidth of the terminal of Rel-8/9/10 is 25 RBs. In assigning resources by using resource assignment type 0, the sizes of the RBGs to which the terminal of Rel-8/9/10 and the terminal of Rel-11 correspond are different. If the resource assignment is performed according to respective RBGs, the utilization of the RBs will be lowered on the premise of not limiting the scheduling algorithm of the base station, resulting in the problem of waste of resources. There is no effective way of solving such a problem at present.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

The embodiments of the present invention provide a method for resource assignment, base station and terminal equipment. With such a method, a problem of waste of RBs in the resource assignment type 0 may be solved in the case where there exist a carrier segment that can be configured in the system and a terminal of Rel-8/9/10 and a terminal of Rel-11 coexist; furthermore, the problem of resource assignment of the resource assignment type 1 in the above case may also be solved.

According to one aspect of the embodiments of the present invention, there is provided a method for resource assignment, including: determining resource block group sizes or numbers of resource block subsets to which a stand-alone carrier and a carrier segment correspond, according to the bandwidth of the stand-alone carrier or the bandwidths of the stand-alone carrier and the carrier segment and corresponding relationship between a bandwidth and a resource block group size; and assigning a resource to terminal equipment according to the resource block group sizes or the numbers of the resource block subsets.

According to another aspect of the embodiments of the present invention, there is provided a method for resource assignment, including:

determining a number of bit of a resource assignment domain in downlink control information when terminal equipment detects a downlink control channel, according to resource block group sizes or numbers of resource block subsets to which a stand-alone carrier and a carrier segment correspond, bandwidths of the stand-alone carrier and the carrier segment and a predetermined indication information format indicating a resource assignment result; and performing blind detection to the downlink control channel by the terminal equipment to derive the downlink control information assigned to the terminal equipment including indication information indicating a resource assignment result; determining by the terminal equipment a resource assignment type according to the first bit of the resource assignment domain in the downlink control information after the terminal equipment derives the downlink control information assigned to the terminal equipment, and performing decoding according to the indication information format to which the determined resource assignment type corresponds, so as to obtain the resource assignment result.

According to still another aspect of the embodiments of the present invention, there is provided a base station, including:

a first determining unit configured to determine resource block group sizes or numbers of resource block subsets to which a stand-alone carrier and a carrier segment correspond, according to the bandwidth of the stand-alone carrier or the bandwidths of the stand-alone carrier and the carrier segment and corresponding relationship between a bandwidth and a resource block group size; and a resource assigner configured to assign a resource to terminal equipment according to the resource block group sizes or the numbers of the resource block subsets.

According to further still another aspect of the embodiments of the present invention, there is provided terminal equipment, including:

a bit number determining unit configured to determine a number of bit of a resource assignment domain in downlink control information according to the resource block group sizes or numbers of resource block subsets to which determined a stand-alone carrier and a carrier segment correspond, bandwidths of the stand-alone carrier and the carrier segment and a predetermined indication information format indicating a resource assignment result;

a detector configured to perform blind detection to the downlink control channel to derive the downlink control information assigned to the terminal equipment; and a resource information acquiring unit configured to determine a resource assignment type according to the first bit of the resource assignment domain after the detector derives the downlink control information assigned to the terminal equipment, and perform decoding according to the indication information format to which the determined resource assignment type corresponds, so as to obtain the resource assignment result.

According to still another aspect of the embodiments of the present invention, there is provided a computer-readable program, wherein when the program is executed in a base station, the program enables a computer to carry out the method for resource assignment as described above in the base station.

According to still another aspect of the embodiments of the present invention, there is provided a storage medium in which a computer-readable program is stored, wherein the computer-readable program enables a computer to carry out the method for resource assignment as described above in a base station.

According to still another aspect of the embodiments of the present invention, there is provided a computer-readable program, wherein when the program is executed in terminal equipment, the program enables a computer to carry out the method for resource assignment as described above in the terminal equipment.

According to still another aspect of the embodiments of the present invention, there is provided a storage medium in which a computer-readable program is stored, wherein the computer-readable program enables a computer to carry out the method for resource assignment as described above in terminal equipment.

The advantages of the embodiments of the present invention reside in that by determining resource block group sizes or numbers of resource block subsets to which a stand-alone carrier and a carrier segment correspond and assigning resources to terminal equipment according to the resource block group sizes or the numbers of the resource block subsets, a problem of waste of RBs in the resource assignment type 0 may be solved in the case where there exist a carrier segment that can be configured in the system and a terminal of Rel-8/9/10 and a terminal of Rel-11 coexist; furthermore, the problem of resource assignment of the resource assignment type 1 in the above case may also be solved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present invention will be apparent from the following detailed description in conjunction with the drawings, in which:

FIG. 1 is a schematic diagram of the indication information format to which the resource assignment type 0 corresponds in an LTE system;

FIG. 2A is a schematic diagram of a resource assignment result by a base station for a certain terminal by using the resource assignment type 0 in a case where a system bandwidth is 25 RBs;

FIG. 2B is a schematic diagram of information indication of the resource assignment result in FIG. 2A;

FIG. 3 is a schematic diagram of the indication information format to which the resource assignment type 1 corresponds in the LTE system;

FIG. 4A is a schematic diagram of a resource assignment result by the base station for a certain terminal by using the resource assignment type 1 in a case where a system bandwidth is 25 RBs;

FIG. 4B is a schematic diagram of information indication of the resource assignment result in FIG. 4A;

FIGS. 7A, 7B and 7C are schematic diagrams of information indication format to which the resource assignment type 0 corresponds when there exists one carrier segment;

FIGS. 8A-8C are schematic diagrams of information indication format to which the resource assignment type 0 corresponds when there exist two carrier segments;

FIGS. 9A-9E are schematic diagrams of information indication format to which the resource assignment type 1 corresponds when there exists one carrier segment;

FIGS. 10A-10E are schematic diagrams of information indication format to which the resource assignment type 1 corresponds when there exist are two carrier segments;

FIG. 14 is a schematic diagram of information indication format to which the resource assignment type 1 corresponds when there exists one carrier segment;

FIG. 15 is a schematic diagram of information indication format to which the resource assignment type 1 corresponds when there exist two carrier segments;

FIG. 16 is a flowchart of the method for resource assignment of Embodiment 3 of the present invention;

FIG. 18A is a schematic diagram of assigning resources by the base station for terminal equipment in an embodiment;

FIG. 18B is a schematic diagram of information indication when the base station uses the format in FIG. 7A;

FIG. 18C is a schematic diagram of information indication when the base station uses the format in FIG. 7B;

FIG. 19A is a schematic diagram of assigning resources by the base station for the terminal equipment in this embodiment;

FIGS. 19B and 19C are schematic diagrams of indication information of the base station for the resource assignment result in FIG. 19A;

FIG. 20A is a schematic diagram of assigning resources by the base station for the terminal equipment in this embodiment;

FIGS. 20B, 20C and 20D are schematic diagrams of indication information for the resource assignment result in FIG. 20A;

FIG. 21A is a schematic diagram of assigning resources by the base station for the terminal equipment in this embodiment;

FIG. 21B is a schematic diagram of information indication when the base station uses the format in FIG. 12;

DETAILED DESCRIPTION OF THE INVENTION

Figure 5A:
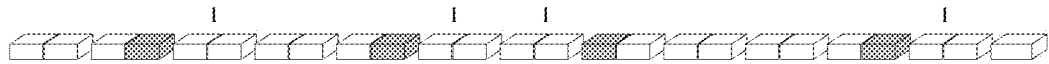
FIG. 5A is a schematic diagram of a resource assignment result for certain terminal equipment of Rel-8/9/10.

Various embodiments of the present invention shall be described below with reference to the accompanying drawings. These embodiments are illustrative only and are not intended to limit the present invention. For easy understanding of the principle and embodiments of the present invention by those skilled in the art, the embodiments of the present invention shall be described taking an LTE-A system in the case where there exist a carrier segment that can be configured in the system and a terminal of Rel-8/9/10 and a terminal of Rel-11 coexist as an example. However, it should be understood that the present invention is not limited thereto, and is applicable to other systems related to resource assignment in the above case.

Description of a method for resource assignment and an indication information format in an LTE system is given first.

In the resource assignment type 0, a resource block group (RBG) consists of several consecutive resource blocks (RBs). In assigning resources for terminal equipment, a base station will take a RBG as a minimum assignment unit; that is, decide whether to assign a certain RBG to the terminal equipment. After obtaining a resource assignment result, the base station will notify the terminal equipment of the resource assignment result via a resource assignment (RA) domain in a downlink resource assignment indicator (DCI).

FIG. 1 is a schematic diagram of the indication information format to which the resource assignment type 0 corresponds in an LTE system. Wherein, "resource assignment type" denotes whether it is resource assignment type 0 or resource assignment type 1, which is 1 bit. "A bitmap of resource assignment" is used to correspondingly indicate whether each RBG is assigned to the terminal equipment, with a number of bit being $N_{RBG} = \lceil N_{RB}^{DL}/P \rceil$; where, $N_{RB}^{DL}$ denotes a downlink system bandwidth, that is, a total number of downlink RBs in the system; and P denotes the size of an RBG, that is, the number of RBs contained in each RBG.

The size of each RBG depends on the system bandwidth, and may be determined according to the system bandwidth and a mapping relation between the bandwidth and the size of the RBG. Table 1 shows a mapping relation between a system bandwidth $N_{RB}^{DL}$ and the size of an RBG.

TABLE 1

| System bandwidth $N_{RB}^{DL}$ | RBG size (P) |
|---|---|
| ≤10 | 1 |
| 11-26 | 2 |
| 27-63 | 3 |
| 64-110 | 4 |

Where, when $N_{RB}^{DL}$ mod P>0, the size of an RBG is $N_{RB}^{DL} - P \cdot \lfloor N_{RB}^{DL}/P \rfloor$. If there are 25 downlink RBs in the system, according to Table 1, in the resource assignment type 0, the size of the RBG is 2.

FIG. 2A is a schematic diagram of a resource assignment result by the base station for a certain terminal by using the resource assignment type 0 in a case where a system bandwidth is 25 RBs, and FIG. 2B is a schematic diagram of information indication of the resource assignment result in FIG. 2A. In FIG. 2A, "1" denotes that a corresponding RBG is assigned to the terminal equipment, and "0" denotes that a corresponding RBG is not assigned to the terminal equipment.

In the resource assignment type 1, the RBs are divided into several subsets first. The number of the RB subsets is equal to the size P of the RBG in the resource assignment type 0. After obtaining a resource assignment result, the base station will notify the terminal equipment of the result via a resource assignment (RA) domain in a downlink resource assignment indicator (DCI).

FIG. 3 is a schematic diagram of the indication information format to which the resource assignment type 1 corresponds in the LTE system. Wherein, "resource assignment type" denotes whether it is resource assignment type 0 or resource assignment type 1, which is 1 bit. "Resource block subset ID (subset)" denotes which resource block subset is assigned for the terminal equipment, which is $\lceil \log_2(P) \rceil$ bit(s). "L/R" indicates whether the bit used for resource assignment start from the left side or the right side of resource block subset to correspond, which is 1 bit. "A bitmap of resource assignment" is used to indicate whether a corresponding RB in the resource block subset is assigned to the terminal equipment, with a number of bit being $N_{RB}^{TYPE1}=\lceil N_{RB}^{DL}/P \rceil - \lceil \log_2(P) \rceil - 1$. For example, if there are 25 downlink RBs in the system, according to Table 1, in the resource assignment type 1, the number of the resource block subsets is 2.

FIG. 4A is a schematic diagram of a resource assignment result by the base station for a certain terminal by using the resource assignment type 1 in a case where a system bandwidth is 25 RBs, and FIG. 4B is a schematic diagram of information indication of the resource assignment result in FIG. 4A. In FIG. 4A, "1" denotes that a corresponding RB in resource block subset "0" is assigned to the terminal equipment, and "0" denotes that a corresponding RB in resource block subset "0" is not assigned to the terminal equipment. In FIG. 4B, L/R being "0" denotes to correspond from the left to the right, and "subset" being "0" denotes that the resource block subset selected by the base station for the terminal equipment is resource block subset "0".

Figure 5B:
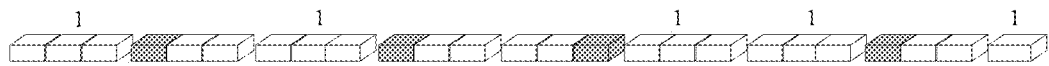
FIG. 5B is a schematic diagram of a resource assignment result for terminal equipment of Rel-11.

In an LTE-A system, a problem of waste of RBs in the resource assignment type 0 in the case where there exist a carrier segment that can be configured and a terminal of Rel-8/9/10 and a terminal of Rel-11 coexist. For example, the base station has a spectrum of a bandwidth of 32 RBs, among which the bandwidth of a stand-alone carrier is 25 RBs, and 6 RBs may be used as the carrier segment. The system bandwidth of the terminal of Rel-11 is 31 RBs, while the system bandwidth of the terminal of Rel-8/9/10 is 25 RBs. In assigning resources by using resource assignment type 0, the sizes of the RBG to which the terminal of Rel-8/9/10 and the terminal of Rel-11 correspond are different. If the resource assignment is performed according to the respective RBG, the utilization of the RBs will be lowered on the premise of not limiting the scheduling algorithm of the base station, resulting in the problem of waste of resources. FIG. 5A is a schematic diagram of a resource assignment result for certain terminal equipment of Rel-8/9/10, in which the RBG to which "1" corresponds denotes that it is assigned to the terminal equipment, and FIG. 5B is a schematic diagram of a resource assignment result for terminal equipment of Rel-11, in which the RBG to which "1" corresponds also denotes that it is assigned to the terminal equipment. Wherein, the parts in grey in FIGS. 5A and 5B denote RBs that cannot be used.

Therefore, this embodiment of the present invention is used to explain that a problem of waste of RBs in the resource assignment type 0 may be solved in the case where there exist a carrier segment that can be configured in the LTE-A system and a terminal of Rel-8/9/10 and a terminal of Rel-11 coexist. As the resource assignment type 1 and the resource assignment type 0 uses the same number bits to indicate resource assignment results, the method for resource assignment provided in the present invention also applicable to the resource assignment type 1.

In the embodiments of the present invention, the number of the carrier segment may be 1 or more than 1 as actually required. In an embodiment that follows, the number of the carrier segment is n, n being a positive integer. The numbers of the bit of the indication information of the resource assignment type 0 and the resource assignment type 1 are identical.

In the embodiment below, both the resource assignment type 0 and the resource assignment type 1 shall be described in cases where 1 carrier segment and 2 carrier segments are contained. And the cases where more than 2 carrier segments are contained are similar to these two cases, and shall not be enumerated herein. Furthermore, in the indication information formats enumerated in the following embodiment, the orders of the indication information of a stand-alone carrier and the indication information of a carrier segment may be arbitrarily set as actually required, the indication information of the stand-alone carrier is arranged before the indication information of the carrier segment, and vice versa. In this embodiment, for example, the indication information of the stand-alone carrier and the indication information of the carrier segment are ordered according to their frequencies, indication information of a low frequency is placed in the front, and indication information of a high frequency is placed in the back, and vice versa; however, it is not limited thereto.

Embodiment 1

Figure 6:
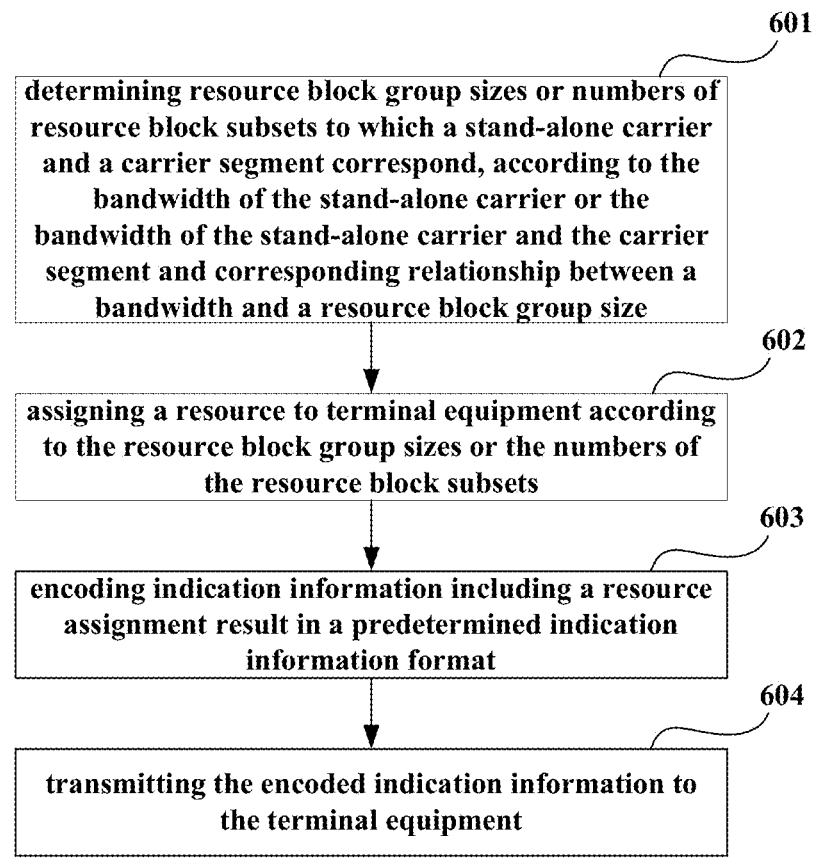
FIG. 6 is a flowchart of the method for resource assignment of Embodiment 1 of the present invention.

An embodiment of the present invention provides a method for resource assignment, and FIG. 6 is a flowchart of the method for resource assignment of Embodiment 1 of the present invention. As shown in FIG. 6, the method includes:

step 601: determining resource block group sizes or numbers of resource block subsets to which a stand-alone carrier and a carrier segment correspond, according to the bandwidth of the stand-alone carrier or the bandwidths of the stand-alone carrier and the carrier segment and corresponding relationship between a bandwidth and a resource block group size; and step 602: assigning a resource to terminal equipment according to the resource block group sizes or the numbers of the resource block subsets.

In this embodiment, for the resource assignment type 0, the RBG sizes to which the stand-alone carrier and carrier segment correspond may be respectively determined according to the bandwidths of the stand-alone carrier and the carrier segment and corresponding relationship between a bandwidth and a RBG size. For example, they may be determined according to the corresponding relationship shown in Table 1, with the RBG size of the stand-alone carrier being denoted by $P_1$, and the RBG size of the carrier segment being denoted by $P_2$.

For example, the bandwidth of a stand-alone carrier is 25 RBs, and it can be seen from Table 1 that the RBG size of the stand-alone carrier is $P_1=2$; and the bandwidth of a carrier segment is 6 RBs, and according to Table 1, the RBG size of the carrier segment is $P_2=1$.

In this embodiment, for the resource assignment type 1, the numbers of resource block subsets to which the stand-alone carrier and the carrier segment correspond are determined.

Wherein, the numbers of the resource block subsets is equal to the size of the RBG in the resource assignment type 0. In this way, in determining the numbers of resource block subsets, the RBG sizes to which the stand-alone carrier and the carrier segment correspond may be respectively determined first according to the bandwidths of the stand-alone carrier and the carrier segment and corresponding relationship between a bandwidth and a RBG size, and then the numbers of the resource block subsets is determined according to that the numbers of the resource block subsets is equal to the size of the RBG in the resource assignment type 0. For example, they may be determined according to the corresponding relationship shown in Table 1, with the number of a resource block subset of the stand-alone carrier being denoted by $P_3$, and the number of a resource block subset of the carrier segment being denoted by $P_4$.

For example, the bandwidth of a stand-alone carrier is 25 RBs, and it can be seen from Table 1 that the number of a resource block subset of the stand-alone carrier is $P_3=2$; and the bandwidth of a carrier segment is 6 RBs, and according to Table 1, the number of a resource block subset of the carrier segment is $P_4=1$.

Hence, after determining the RBG sizes or the numbers of the resource block subsets to which the stand-alone carrier and the carrier segment correspond, the base station may assign a resource for the terminal equipment according to the determined RBG sizes or the numbers of the resource block subsets to which the stand-alone carrier and the carrier segment correspond; wherein, the manner of assigning the resource may employ any existing manner, such as a maximum carrier to interference scheduling algorithm, or a proportional fairness scheduling algorithm, which shall not be described herein any further.

With the embodiment above, waste of RBs in the resource assignment type 0 may be avoided on the one hand, and on the other hand, a solution for resource assignment of the resource assignment type 1 is provided.

In this embodiment, after assigning the resource for the terminal equipment, the base station may further notify the resource assignment result to the terminal equipment, so that the terminal equipment obtains the resource assigned by the base station for it. Hence, as shown in FIG. 6, the method may further include the following steps:

step 603: encoding indication information including a resource assignment result in a predetermined indication information format;

wherein, the predetermined indication information format is a first indication information format respectively indicating the resource assignment results of the stand-alone carrier and the carrier segment;

step 604: transmitting the encoded indication information to the terminal equipment;

wherein, the base station may contain the indication information in downlink control information and transmit the downlink control information to the terminal equipment.

The indication information of the resource assignment type 0 and the resource assignment type 1 in case of the first indication information format shall be described below. First, for the resource assignment type 0, the indication information may include: a resource assignment type, information on whether each RBG of the stand-alone carrier is assigned to the terminal equipment and information on whether each RBG of the carrier segment is assigned to the terminal equipment.

In this embodiment, the information on whether each RBG of the stand-alone carrier is assigned to the terminal equipment and the information on whether each RBG of the carrier segment is assigned to the terminal equipment may be denoted by a bitmap of resource assignment. Following description is given taking a manner of denoting a bitmap as an example.

Wherein, the number of resource assignment type may be 1, and is used to indicate the resource assignment types of the stand-alone carrier and the carrier segment; or the number of resource assignment type may be n+1, and are used to indicate the resource assignment types of the stand-alone carrier and n carrier segment(s); in such a case, the resource assignment types may be identical or different.

In this case, the numbers of bit of the bitmaps of the resource assignment of the stand-alone carrier and the carrier segment may use the formulae below:

the number of bit of the bitmap of the resource assignment of the stand-alone carrier is $\lceil N_{RB1}^{DL}/P_1 \rceil$ and the number of bit of the bitmap of the resource assignment of each carrier segment when the number of the carrier segment is n is expressed as $\lceil N_{RBi}^{DL}/P_i \rceil$; where, $N_{RB1}^{DL}$ is a bandwidth of the stand-alone carrier, $N_{RBi}^{DL}$ is a bandwidth of an i-th carrier segment, $P_1$ is the RBG size or the number of a resource block subset of the stand-alone carrier, and $P_i$ is the RBG size or the number of a resource block subset of an i-th stand-alone carrier; where, i is an integer from 1 to n, n being a positive integer.

In this embodiment, the object of determining the number of bit of the resource assignment of the stand-alone carrier and the carrier segment is that in encoding by the base station in step 603, the base station needs to learn the number of bit of the resource assignment, which may be predetermined and stored in the base station after determining the indication information format, and the base station may use directly the number of bit in encoding. Furthermore, the base station may also notify the number of bit to the terminal equipment, or the terminal equipment may determine or store according to the indication information format, for use by the terminal equipment in decoding. The processes of encoding and decoding are similar to the prior art, which shall not be described herein any further.

The above case shall be described below by way of examples. It should be noted that the indication information format below is just an embodiment of the present invention, and it is not limited thereto.

FIGS. 7A-7C are schematic diagrams of information indication format to which the resource assignment type 0 corresponds when there exists one carrier segment. Referring to FIGS. 7A-7C, a case where there exists one carrier segment and the carrier frequency of the carrier segment is higher than that of a stand-alone carrier is shown.

As shown in FIG. 7A, one resource assignment type, resource assignment type 0, is used, which is used to respectively indicate the bitmaps of resource assignment of a stand-alone carrier and a carrier segment.

As shown in FIGS. 7B and 7C, two resource assignment types, i.e. a resource assignment type of the stand-alone carrier and a resource assignment type of the carrier segment, are used, indicating the bitmaps of the resource assignment of the stand-alone carrier and the carrier segment. Wherein, the two resource assignment types may be the same, i.e. both of them may be resource assignment 0; and the resource assignment types may also be different, for example, one is resource assignment 0, and the other is resource assignment 1. When the resource assignment type is the resource assignment type 1, information, such as resource block subset ID(Subset), and whether the bits for the resource assignment correspond from the left or from the right (L/R), etc., may be correspondingly included. Furthermore, the bits of the resource assignment types may be arranged in an alternative or neighboring manner.

In such a case, the numbers of bit indicating the bitmaps of the resource assignment of the stand-alone carrier and the carrier segment are $\lceil N_{RB1}^{DL}/P_1 \rceil$ and $\lceil N_{RB2}^{DL}/P_2 \rceil$; where, $N_{RB1}^{DL}$ is the bandwidth of the stand-alone carrier, $N_{RB2}^{DL}$ is the bandwidth of the carrier segment, $P_1$ is the RBG size or the number of a resource block subset of the stand-alone carrier, and $P_2$ is the RBG size or the number of a resource block subset of the carrier segment.

FIGS. 8A-8C are schematic diagrams of information indication format to which the resource assignment type 0 corresponds when there exist two carrier segments. As shown in FIGS. 8A-8C, a case where there exist two carrier segments and the carrier frequency of one carrier segment is higher than that of a stand-alone carrier and the carrier frequency of the other carrier is lower than that of the stand-alone carrier is shown. The definitions of the contents of each domain in FIGS. 8A-8C are the same as those above, which shall not be described herein any further.

In such a case, the numbers of bit indicating the bitmaps of the resource assignment of the stand-alone carrier and the carrier segment 1 and the carrier segment 2 are $\lceil N_{RB1}^{DL}/P_1 \rceil$, $\lceil N_{RB2}^{DL}/P_2 \rceil$ and $\lceil N_{RB3}^{DL}/P_3 \rceil$ respectively; where, $N_{RB}^{DL}$ is the bandwidth of the stand-alone carrier, $N_{RB2}^{DL}$ is the bandwidth of the carrier segment 1, $N_{RB1}^{DL}$ is the bandwidth of the carrier segment 2, $P_1$ is the RBG size or the number of a resource block subset of the stand-alone carrier, $P_2$ is the RBG size or the number of a resource block subset of the carrier segment 1, and $P_3$ is the RBG size or the number of a resource block subset of the carrier segment 2.

Second, for the resource assignment type 1, similar to the resource assignment type 0, the indication information includes a resource assignment type, resource block subset ID(Subset) of a stand-alone carrier and resource block subset ID(Subset) of a carrier segment, indication identification (L/R) on whether the bit for the resource assignment start from the left side or from the right side of a resource block subset, information on whether corresponding RB(s) in the stand-alone carrier is(are) assigned to the terminal equipment and information on whether corresponding RB(s) in the carrier segment is(are) assigned to the terminal equipment.

In this embodiment, the information on whether corresponding RBs in the stand-alone carrier and in the carrier segment are assigned to the terminal equipment may be denoted by a bitmap of resource assignment. Following description is given taking a manner of denoting a bitmap as an example.

Wherein, the number of the resource assignment type may be 1, and is used to indicate the resource assignment type 1 of the stand-alone carrier and the carrier segment.

Furthermore, the number of the indication identification (L/R) on whether the bit for the resource assignment start from the left side or from the right side of a resource block subset may be 1, indicating that the bits for the resource assignment of the stand-alone carrier and the carrier segment start from the left side or from the right side of a resource block subset; and it also be more than 1, indicating respectively that the bits for the resource assignment of the stand-alone carrier and n carrier segment(s) start from the left side or from the right side of a resource block subset; the more than 1 pieces of L/R may be identical or different, and may be arranged in a neighboring or alternative manner.

In such a case, the determination of the numbers of bit of the bitmaps of the resource assignment of the stand-alone carrier and the carrier segment may include following several cases.

First Case:

when the indication information format of the resource assignment type 0 includes 1 resource assignment type, information on whether each RBG of the stand-alone carrier is assigned to the terminal equipment and information on whether each RBG of the carrier segment is assigned to the terminal equipment, and the indication information of the resource assignment type 1 includes a resource assignment type, resource block subset ID(Subset) of the stand-alone carrier and resource block subset ID(Subset) of the carrier segment, 1 piece of indication identification (L/R) on whether the bit for the resource assignment start from the left side or from the right side of a resource block subset, information on whether corresponding RB(s) in the stand-alone carrier is(are) assigned to the terminal equipment and information on whether corresponding RB(s) in the carrier segment is(are) assigned to the terminal equipment, the numbers of bit of the bitmaps of the resource assignment of the stand-alone carrier and the n carrier segment(s) are calculated by using the formulae below:

$$\lceil N_{RB}^{DL}/P \rceil - \lceil \log_2(P) \rceil \text{ and } \lceil N_{RBk}^{DL}/P_k \rceil - \lceil \log_2(P_k) \rceil - 1;$$

wherein, when the number of bit of the bitmap of the resource assignment of a k-th carrier is $\lceil N_{RBk}^{DL}/P_k \rceil - \lceil \log_2(P_k) \rceil - 1$, the number of bit of the bitmap of the resource assignment of the rest carrier is $\lceil N_{RB}^{DL}/P \rceil - \lceil \log_2(P) \rceil$;

where, the k-th carrier is one of the stand-alone carrier and the n carrier segment(s), $N_{RBk}^{DL}$ is the bandwidth of the k-th carrier, $P_k$ is the RBG size or the number of a resource block subset of the k-th carrier, N is the bandwidth of the rest carrier, and P is the RBG size or the number of a resource block subset of the rest carrier, n being a positive integer.

Second Case:

when the indication information of the resource assignment type 0 includes a first resource assignment type and information on whether each RBG of the corresponding stand-alone carrier is assigned to the terminal equipment and n second resource assignment type and information on whether each RBG of corresponding n carrier segment is assigned to the terminal equipment, and the indication information of the resource assignment type 1 includes a resource assignment type, resource block subset ID(Subset) of the stand-alone carrier and resource block subset ID(Subset) of the carrier segment, 1 piece of indication identification on whether the bit for the resource assignment start from the left side or from the right side of a resource block subset, information on whether corresponding RB(s) in the resource block subset of the stand-alone carrier is(are) assigned to the terminal equipment and information on whether corresponding RB(s) in the resource block subset of the carrier segment(s) is(are) assigned to the terminal equipment, the values of the numbers of bit of the bitmaps of the resource assignment of the stand-alone carrier and the n carrier segment(s) are calculated by using the formula below:

$$\lceil N_{RB}^{DL}/P \rceil - \lceil \log_2(P) \rceil;$$

where, N is the bandwidth of a corresponding carrier, and P is the RBG size or the number of a resource block subset of the corresponding carrier.

Third Case:

when the indication information of the resource assignment type 0 includes 1 resource assignment type, information on whether each RBG of the stand-alone carrier is assigned to the terminal equipment and information on whether each RBG of the carrier segment is assigned to the terminal equipment, and the indication information of the resource assignment type 1 includes a resource assignment type, identification of a resource block subset of a stand-alone carrier and identification of a resource block subset of a carrier segment, n+1 pieces of indication identification on whether the bits for the resource assignment start from the left side or from the right side of a resource block subset, information on whether corresponding RB(s) in the resource block subset of the stand-alone carrier is(are) assigned to the terminal equipment and information on whether corresponding RB(s) in the resource block subset of the carrier segment(s) is(are) assigned to the terminal equipment, the values of the numbers of bit of the bitmaps of the resource assignment of the stand-alone carrier and the n carrier segment(s) are calculated by using the formula below:

$$\lceil N_{RB}^{DL}/P \rceil - \lceil \log_2(P) \rceil - 1;$$

where, $N_{RB}^{DL}$ is the bandwidth of a corresponding carrier, and P is the RBG size or the number of a resource block subset of the corresponding carrier.

Fourth Case:

when the indication information of the resource assignment type 0 includes a first resource assignment type, information on whether each RBG of the corresponding stand-alone carrier is assigned to the terminal equipment and n second resource assignment type(s) and information on whether each RBG of corresponding n carrier segment(s) is assigned to the terminal equipment, and the indication information of the resource assignment type 1 includes a resource assignment type, identification of a resource block subset of the stand-alone carrier and identification of a resource block subset of the carrier segment, n+1 pieces of indication identification on whether the bit for the resource assignment start from the left side or from the right side of a resource block subset, information on whether corresponding RB(s) in the resource block subset of the stand-alone carrier is(are) assigned to the terminal equipment and information on whether corresponding RB(s) in the resource block subset of the carrier segment is(are) assigned to the terminal equipment, the numbers of bit of the bitmaps of the resource assignment of the stand-alone carrier and the carrier segment are calculated by using the formulae below:

$$\lceil N_{RB}^{DL}/P \rceil - \lceil \log_2(P) \rceil \text{ and } \lceil N_{RBk}^{DL}/P_k \rceil - \lceil \log_2(P_k) \rceil - 1;$$

wherein, when the number of bit of the bitmap of the resource assignment of a k-th carrier is $\lceil N_{RBk}^{DL}/P_k \rceil - \lceil \log_2(P_k) \rceil - 1$, the number of bit of the bitmap of the resource assignment of the rest carrier is $\lceil N_{RB}^{DL}/P \rceil - \lceil \log_2(P) \rceil$;

where, the k-th carrier is one of the stand-alone carrier and the n carrier segment(s), $N_{RBk}^{DL}$ is the bandwidth of the k-th carrier, $P_k$ is the RBG size or the number of a resource block subset of the k-th carrier, $N_{RB}^{DL}$ is the bandwidth of the rest carrier, and P is the RBG size or the number of a resource block subset of the rest carrier, n being a positive integer.

Following description is given by way of examples. The examples below are just embodiments of the present invention, and it is not limited to the following formats.

FIGS. 9A-9E are schematic diagrams of information indication format to which the resource assignment type 1 corresponds when there exists one carrier segment. Referring to FIGS. 9A-9E, a case where there exists one carrier segment and the carrier frequency of the carrier segment is higher than that of a stand-alone carrier is shown.

As shown in FIGS. 9A and 9B, one resource assignment type 1, 1 piece of L/R indication information, resource block subset identification(Subset) of a stand-alone carrier and resource block subset identification(Subset) of a carrier segment, are used to respectively indicate the bitmaps of resource assignment of the stand-alone carrier and the carrier segment.

As shown in FIGS. 9C-9E, one resource assignment type, 2 pieces of L/R indication information, resource block subset identification(Subset) of a stand-alone carrier and resource block subset identification(Subset) of a carrier segment are used to indicate bitmaps of resource assignment of the stand-alone carrier and the carrier segment. Wherein, the L/R indication information may be identical, such as from the left to the right; and it may also be different, such as one piece is from the left to the right, and the other piece is from the right to the left.

When the resource assignment type 0 uses the format shown in FIG. 7A and the resource assignment type 1 uses the format shown in FIG. 9A or 9B, the numbers of bit of the bitmaps of the resource assignment of the stand-alone carrier and the carrier segment in the resource assignment type 1 may respectively be:

$$\lceil N_{RB1}^{DL}/P_1 \rceil - \lceil \log_2(P_1) \rceil - 1 \text{ and } \lceil N_{RB2}^{DL}/P_2 \rceil - \lceil \log_2(P_2) \rceil \text{ or }$$

$$\lceil N_{RB1}^{DL}/P_1 \rceil - \lceil \log_2(P_1) \rceil \text{ and } \lceil N_{RB2}^{DL}/P_2 \rceil - \lceil \log_2(P_2) \rceil - 1;$$

where, $N_{RB1}^{DL}$ is the bandwidth of the stand-alone carrier, $N_2$ is the bandwidth of the carrier segment, $P_1$ is the RBG size or the number of a resource block subset of the stand-alone carrier, and $P_2$ is the RBG size or the number of a resource block subset of the carrier segment.

When the resource assignment type 0 uses the format shown in FIG. 7B or 7C and the resource assignment type 1 uses the format shown in FIG. 9A or 9B, the numbers of bit of the bitmaps of the resource assignment of the stand-alone carrier and the carrier segment in the resource assignment type 1 may respectively be:

$$\lceil N_{RB}^{DL}/P_1 \rceil - \lceil \log_2(P_1) \rceil \text{ and } \lceil N_{RB2}^{DL}/P_2 \rceil - \lceil \log_2(P_k) \rceil - 1.$$

When the resource assignment type 0 uses the format shown in FIG. 7A and the resource assignment type 1 uses the format shown in FIG. 9C or 9D or 9E, the numbers of bit of the bitmaps of the resource assignment of the stand-alone carrier and the carrier segment in the resource assignment type 1 may respectively be:

$$\lceil N_{RB1}^{DL}/P_1 \rceil - \lceil \log_2(P_1) \rceil - 1 \text{ and } \lceil N_{RB2}^{DL}/P_2 \rceil - \lceil \log_2(P_2) \rceil - 1.$$

When the resource assignment type 0 uses the format shown in FIG. 7B or 7C and the resource assignment type 1 uses the format shown in FIG. 9C or 9D or 9E, the numbers of bit of the bitmaps of the resource assignment of the stand-alone carrier and the carrier segment in the resource assignment type 1 may respectively be:

$$\lceil N_{RB1}^{DL}/P_1 \rceil - \lceil \log_2(P_1) \rceil - 1 \text{ and } \lceil N_{RB2}^{DL}/P_2 \rceil - \lceil \log_2(P_2) \rceil, \text{ or}$$

$$\lceil N_{RB1}^{DL}/P_1 \rceil - \lceil \log_2(P_1) \rceil \text{ and } \lceil N_{RB2}^{DL}/P_2 \rceil - \lceil \log_2(P_2) \rceil - 1.$$

FIGS. 10A-10E are schematic diagrams of information indication format to which the resource assignment type 1 corresponds when there exist two carrier segments. Referring to FIGS. 10A-10E, a case where there exist two carrier segments and the carrier frequency of one carrier segment is higher than that of a stand-alone carrier, the carrier frequency of the other carrier segment is lower than that of the stand-alone carrier is shown.

The definitions of the contents of each domain in FIGS. 10A-10E are the same as those above, which shall not be described herein any further. The determination of the numbers of bit of the bitmaps in these figures is described below in detail.

When the resource assignment type 0 uses the format shown in FIG. 8A and the resource assignment type 1 uses the format shown in FIG. 10A or 10B, the numbers of bit of the bitmaps of the resource assignment of the stand-alone carrier and the carrier segment in the resource assignment type 1 may respectively be:

$$\lceil N_{RB1}^{DL}/P_1 \rceil - \lceil \log_2(P_1) \rceil - 1, \lceil N_{RB2}^{DL}/P_2 \rceil - \lceil \log_2(P_2) \rceil \text{ and } \lceil N_{RB3}^{DL}/P_3 \rceil - \lceil \log_2(P_3) \rceil; \text{ or}$$

$$\lceil N_{RB1}^{DL}/P_1 \rceil - \lceil \log_2(P_1) \rceil, \lceil N_{RB2}^{DL}/P_2 \rceil - \lceil \log_2(P_2) \rceil - 1 \text{ and } \lceil N_{RB3}^{DL}/P_3 \rceil - \lceil \log_2(P_3) \rceil; \text{ or}$$

$$\lceil N_{RB1}^{DL}/P_1 \rceil - \lceil \log_2(P_1) \rceil, \lceil N_{RB2}^{DL}/P_2 \rceil - \lceil \log_2(P_2) \rceil \text{ and } \lceil N_{RB3}^{DL}/P_3 \rceil - \lceil \log_2(P_3) \rceil - 1;$$

where, $N_1$ is the bandwidth of the stand-alone carrier, $N_2$ is the bandwidth of carrier segment 1, $N_3$ is the bandwidth of carrier segment 2, $P_1$ is the RBG size or the number of a resource block subset of the stand-alone carrier, $P_2$ is the RBG size or the number of a resource block subset of carrier segment 1, and $P_3$ is the RBG size or the number of a resource block subset of carrier segment 2.

When the resource assignment type 0 uses the format shown in FIG. 8B or 8C and the resource assignment type 1 uses the format shown in FIG. 10A or 10B, the numbers of bit of the bitmaps of the resource assignment of the stand-alone carrier and the carrier segment in the resource assignment type 1 may respectively be:

$\lceil N_{RB1}^{DL}/P_1 \rceil - \lceil \log_2(P_1) \rceil, \lceil N_{RB2}^{DL}/P_2 \rceil - \lceil \log_2(P_2) \rceil$ and $\lceil N_{RB3}^{DL}/P_3 \rceil - \lceil \log_2(P_3) \rceil$.

When the resource assignment type 0 uses the format shown in FIG. 8A and the resource assignment type 1 uses the format shown in FIG. 10C, 10D or 10E, the numbers of bit of the bitmaps of the resource assignment of the stand-alone carrier and the carrier segment in the resource assignment type 1 may respectively be:

$\lceil N_{RB1}^{DL}/P_1 \rceil - \lceil \log_2(P_1) \rceil - 1$ and $\lceil N_{RB2}^{DL}/P_2 \rceil - \lceil \log_2(P_2) \rceil - 1$ and $\lceil N_{RB3}^{DL}/P_3 \rceil - \lceil \log_2(P_3) \rceil - 1$;

When the resource assignment type 0 uses the format shown in FIG. 8B or 8C and the resource assignment type 1 uses the format shown in FIG. 10C, 10D or 10E, the numbers of bit of the bitmaps of the resource assignment of the stand-alone carrier and the carrier segment in the resource assignment type 1 may respectively be:

$\lceil N_{RB1}^{DL}/P_1 \rceil - \lceil \log_2(P_1) \rceil - 1, \lceil N_{RB2}^{DL}/P_2 \rceil - \lceil \log_2(P_2) \rceil$ and $\lceil N_{RB3}^{DL}/P_3 \rceil - \lceil \log_2(P_3) \rceil$;

or $\lceil N_{RB1}^{DL}/P_1 \rceil - \lceil \log_2(P_1) \rceil, \lceil N_{RB2}^{DL}/P_2 \rceil - \lceil \log_2(P_2) \rceil - 1$ and $\lceil N_{RB3}^{DL}/P_3 \rceil - \lceil \log_2(P_3) \rceil$ or $\lceil N_{RB1}^{DL}/P_1 \rceil - \lceil \log_2(P_1) \rceil, \lceil N_{RB2}^{DL}/P_2 \rceil - \lceil \log_2(P_2) \rceil$ and $\lceil N_{RB3}^{DL}/P_3 \rceil - \lceil \log_2(P_3) \rceil - 1$.

It can be seen from the above embodiment that after the base station assigns a resource for the terminal equipment, the resource assignment result may be expressed by using any indication information format shown in FIGS. 7A-10E according to the resource assignment types, and the resource assignment result may be contained in DCI for notifying to the terminal equipment via a PDCCH, thereby avoiding waste of RBs in the resource assignment type 0 on the one hand, and providing a solution for resource assignment of the resource assignment type 1 on the other hand. In this way, in detecting a downlink control channel, the terminal equipment may determine the number of bit in the RA domain in the DCI according to the RBG sizes or the numbers of resource block subset to which the stand-alone carrier and the carrier segment correspond, the bandwidths of the stand-alone carrier and the carrier segment and a predefined indication information format; and after the terminal equipment derives the DCI assigned for it by performing blind detection to a physical downlink control channel (PDCCH), it determines a resource assignment type according to a starting bit in the RA domain in the DCI, and performs corresponding decoding according to the indication information format to which the determined resource assignment type corresponds, so as to obtain a resource assignment result.

Embodiment 2

Figures 11, 12, 13:
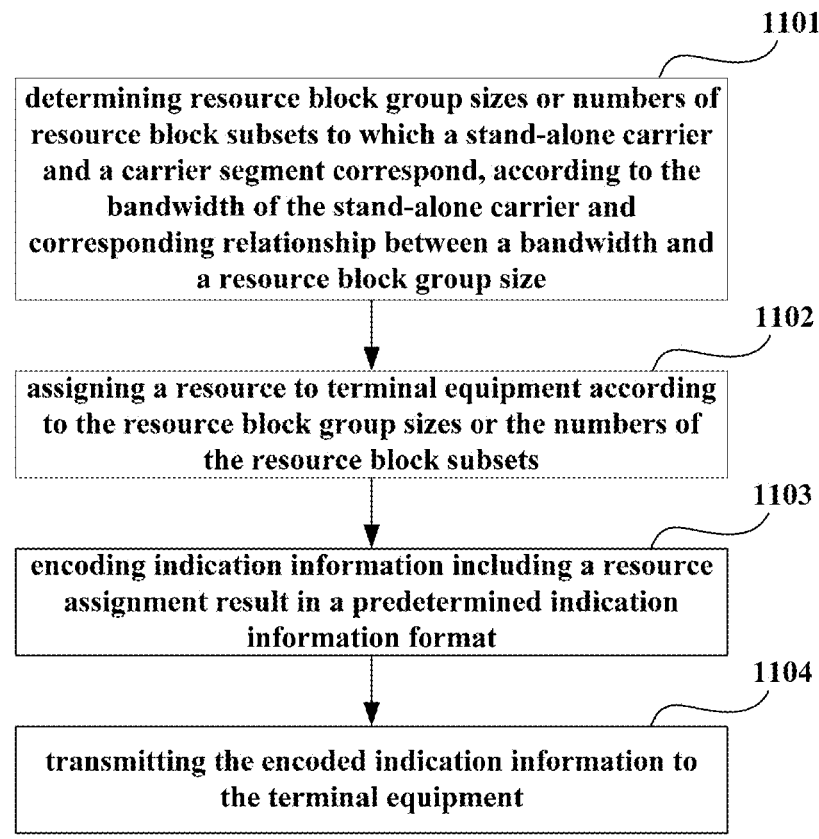
FIG. 11 is a flowchart of the method for resource assignment of Embodiment 2 of the present invention.
FIG. 12 is a schematic diagram of information indication format to which the resource assignment type 0 corresponds when there exists one carrier segment.
FIG. 13 is a schematic diagram of information indication format to which the resource assignment type 0 corresponds when there exist two carrier segments.

An embodiment of the present invention provides a method for resource assignment, and FIG. 11 is a flowchart of the method for resource assignment of Embodiment 2 of the present invention. As shown in FIG. 11, the method includes:

step 1101: determining resource block group sizes or numbers of resource block subsets to which a stand-alone carrier and a carrier segment correspond, according to the bandwidth of the stand-alone carrier and corresponding relationship between a bandwidth and a resource block group size; and step 1102: assigning a resource to terminal equipment according to the resource block group sizes or the numbers of the resource block subsets.

In this embodiment, for the resource assignment type 0, the RBG sizes to which the stand-alone carrier and carrier segment correspond may be determined according to the bandwidth of the stand-alone carrier and corresponding relationship between a bandwidth and a RBG size. For example, it can be determined according to the bandwidth of the stand-alone carrier and the corresponding relationship shown in Table 1 that the RBG sizes of the stand-alone carrier and the carrier segment is $P_1$.

For example, the bandwidth of a stand-alone carrier is 25 RBs, and the bandwidth of a carrier segment is 6 RBs, and it can be seen from the bandwidth of the stand-alone carrier and Table 1 that the RBG size of the stand-alone carrier is $P_1=2$; and in such a case, the RBG size of the carrier segment is also 2.

Correspondingly, for the resource assignment type 1, the RBG size to which the stand-alone carrier corresponds may be determined first according to the bandwidth of the stand-alone carrier and corresponding relationship between a bandwidth and a RBG size, and then the number of a resource assignment subset is determined according to that the number of a resource assignment subset is equal to the RBG size in the resource assignment type 0. For example, it can be determined according to the bandwidth of the stand-alone carrier and the corresponding relationship shown in Table 1 that the number of a resource assignment subset of the stand-alone carrier is $P_2$, and the number of a resource assignment subset of the carrier segment is also $P_2$.

For example, the bandwidth of a stand-alone carrier is 25 RBs, and it can be seen from Table 1 that the numbers of a resource assignment subset of the stand-alone carrier and the carrier segment are $P_2=2$.

Hence, after determining the RBG sizes or the numbers of resource assignment subsets to which the stand-alone carrier and the carrier segment correspond, the base station may assign a resource for the terminal equipment according to the determined RBG sizes or the numbers of resource assignment subsets to which the stand-alone carrier and the carrier segment correspond; wherein, the manner of assigning a resource may employ any existing manner, such as a maximum carrier to interference scheduling algorithm, or a proportional fairness scheduling algorithm, which shall not be described herein any further.

With the embodiment above, waste of RBs in the resource assignment type 0 may be avoided on the one hand, and on the other hand, a solution for resource assignment of the resource assignment type 1 is provided.

In this embodiment, after assigning the resource for the terminal equipment, the base station may further notify the resource assignment result to the terminal equipment, so that the terminal equipment obtains the resource assigned by the base station for it. Hence, as shown in FIG. 11, the method may further comprise the following steps:

step 1103: encoding indication information including a resource assignment result in a predetermined indication information format;

wherein, the predetermined indication information format is a second indication information format integrally indicating the resource assignment results of the stand-alone carrier and the carrier segment;

step 1104: transmitting the encoded indication information to the terminal equipment;

wherein, the base station may contain the indication information in downlink control information for transmitting to the terminal equipment.

In this embodiment, the base station may further need to determine the number of bit of the resource assignment of the stand-alone carrier and the carrier segment as a whole in the indication information format, which may be predetermined and stored in the base station, for use in encoding; furthermore, the terminal equipment may determine and store in advance, or the number of bit is notified by the base station, for use in decoding. This is similar to that in Embodiment 1, and shall not be described herein any further.

The indication information of the resource assignment type 0 and the resource assignment type 1 in case of the second indication information format shall be described below.

First, for the resource assignment type 0, the indication information may include: a resource assignment type and information on whether each RBG of the stand-alone carrier and the carrier segment as a whole is assigned to the terminal equipment.

In this embodiment, the information on whether each RBG of the stand-alone carrier and the carrier segment is assigned to the terminal equipment may be denoted by a bitmap of resource assignment. Following description is given taking a manner of denoting a bitmap as an example.

In this case, the number of bit of the bitmap of the resource assignment of the stand-alone carrier and the carrier segment as a whole is:

$$\left\lceil \left( N_{RB1}^{DL} + \sum_{i=1}^{n} N_{RBi}^{DL} \right) \middle/ P_1 \right\rceil;$$

where, $N_{RB1}^{DL}$ is a bandwidth of the stand-alone carrier, $N_{RBi}^{DL}$ is a bandwidth of an i-th carrier segment, and $P_1$ is the RBG size or the number of a resource block subset determined according to the bandwidth of the stand-alone carrier; wherein, i is an integer from 1 to n, n being a positive integer.

FIG. 12 is a schematic diagram of information indication format to which the resource assignment type 0 corresponds when there exists one carrier segment. As shown in FIG. 12, a case where there exists one carrier segment and the carrier frequency of the carrier segment is higher than that of a stand-alone carrier is shown. One resource assignment type, resource assignment type 0, is used, which is used to indicate the bitmap of resource assignment of a stand-alone carrier and a carrier segment as a whole.

In such a case, the number of bit integrally indicating the bitmap of the resource assignment of the stand-alone carrier and the carrier segment is $\lceil (N_{RB1}^{DL}+N_{RB2}^{DL})/P_1 \rceil$; where, $N_{RB1}^{DL}$ is the bandwidth of the stand-alone carrier, $N_{RB2}^{DL}$ is the bandwidth of the carrier segment, and $P_1$ is the RBG size or the number of a resource block subset determined according to the bandwidth of the stand-alone carrier.

FIG. 13 is a schematic diagram of information indication format to which the resource assignment type 0 corresponds when there exist two carrier segments. As shown in FIG. 13, a case where there exist two carrier segments and the carrier frequency of one carrier segment is higher than that of a stand-alone carrier and the carrier frequency of the other carrier segment is lower than that of the stand-alone carrier is shown. As shown in FIG. 13, one resource assignment type, resource assignment type 0, is used, which is used to indicate the bitmap of resource assignment of carrier segment 1, a stand-alone carrier and carrier segment 2 as a whole.

In such a case, the number of bit integrally indicating the bitmap of the resource assignment of carrier segment 1, the stand-alone carrier and carrier segment 2 is $\lceil (N_{RB1}^{DL}+N_{RB2}^{DL}+N_{RB3}^{DL})/P_1 \rceil$; where, $N_{RB1}^{DL}$ is the bandwidth of the stand-alone carrier, $N_{RB2}^{DL}$ is the bandwidth of carrier segment 1, $N_{RB3}^{DL}$ is the bandwidth of carrier segment 2, and $P_1$ is the RBG size or the number of a resource block subset determined according to the bandwidth of the stand-alone carrier.

Second, for the resource assignment type 1, similar to the resource assignment type 0, the indication information includes a resource assignment type (Type), resource block subset ID (Subset), indication identification (L/R) on whether the bit for the resource assignment start from the left side or from the right side of the resource block subset, and information on whether corresponding RB(s) in the resource block subset of the stand-alone carrier and the carrier segment as a whole is(are) assigned to the terminal equipment.

In this embodiment, the information on whether corresponding RB(s) in the resource block subset of the stand-alone carrier and the carrier segment is(are) assigned to the terminal equipment may be denoted by a bitmap of resource assignment. Following description is given taking a manner of denoting a bitmap as an example.

In such a case, the number of bit of the bitmap of resource assignment of the stand-alone carrier and the carrier segment as a whole is:

$$\left\lceil \left( N_{RB1}^{DL} + \sum_{i=1}^{n} N_{RBi}^{DL} \right) P_1 \right\rceil - \lceil \log_2 P_1 \rceil - 1;$$

where $N_{RB1}^{DL}$ is the bandwidth of the stand-alone carrier, $N_{RBi}^{DL}$ is the bandwidth of the i-th carrier segment, and $P_1$ is the RBG size or the number of a resource block subset determined according to the bandwidth of the stand-alone carrier, wherein i is an integer from 1 to n, n being a positive integer.

FIG. 14 is a schematic diagram of information indication format to which the resource assignment type 1 corresponds when there exists one carrier segment. As shown in FIG. 14, one resource assignment type, resource assignment type 1, 1 piece of L/R indication information and resource block subset ID (Subset) of a stand-alone carrier and a carrier segment, are used to indicate the bitmap of resource assignment of the stand-alone carrier and the carrier segment as a whole.

In such a case, the number of bit integrally indicating the bitmap of the resource assignment of the stand-alone carrier and the carrier segment is $\lceil (N_{RB1}^{DL}+N_{RB2}^{DL})/P_1 \rceil - \log_2 P_1 - 1$; where, $N_{RB1}^{DL}$ is the bandwidth of the stand-alone carrier, $N_{RB2}^{DL}$ is the bandwidth of the carrier segment, and $P_1$ is the RBG size or the number of a resource block subset determined according to the bandwidth of the stand-alone carrier.

FIG. 15 is a schematic diagram of information indication format to which the resource assignment type 1 corresponds when there exist two carrier segments. As shown in FIG. 15, a case where there exist two carrier segments and the carrier frequency of one carrier segment is higher than that of a stand-alone carrier and the carrier frequency of the other carrier segment is lower than that of the stand-alone carrier is shown. As shown in FIG. 15, one resource assignment type, resource assignment type 1, 1 piece of L/R indication information and resource block subset ID (Subset) of the stand-alone carrier and the carrier segment, are used to indicate the bitmap of resource assignment of the stand-alone carrier and carrier segments as a whole.

In such a case, the number of bit integrally indicating the bitmap of the resource assignment of the stand-alone carrier and the carrier segments is $\lceil (N_{RB1}^{DL}+N_{RB2}^{DL}+N_{RB3}^{DL})/P_1 \rceil - \lceil \log_2 P_1 \rceil -1$; where, $N_{RB1}^{DL}$ is the bandwidth of the stand-alone carrier, $N_{RB2}^{DL}$ is the bandwidth of carrier segment 1, $N_{RB3}^{DL}$ is the bandwidth of carrier segment 2, and $P_1$ is the RBG size or the number of a resource block subset determined according to the bandwidth of the stand-alone carrier.

It can be seen from the above embodiment that after the base station assigns a resource for the terminal equipment, the resource assignment result may be expressed by using any indication information format shown in FIGS. 12-15 according to the resource assignment type, and the resource assignment result may be notified to the terminal equipment, thereby avoiding waste of RBs in the resource assignment type 0 on the one hand, and providing a solution for resource assignment of the resource assignment type 1 on the other hand. In detecting a downlink control channel, the terminal equipment may determine the number of bit in the RA domain in the DCI according to the RBG sizes or the numbers of resource block subsets, the bandwidths of the stand-alone carrier and the carrier segment and a predefined indication information format; and after the terminal equipment derives the DCI assigned for it by performing blind detection to a physical downlink control channel (PDCCH), it determines a resource assignment type according to a starting bit in the RA domain in the DCI, and performs corresponding decoding according to the indication information format to which the determined resource assignment type corresponds, so as to obtain a resource assignment result.

Embodiment 3

An embodiment of the present invention provides a method for resource assignment, and FIG. 16 is a flowchart of the method for resource assignment of Embodiment 3 of the present invention. As shown in FIG. 16, the method includes:

step 1601: determining a number of bit of a resource assignment domain in downlink control information when terminal equipment detects a PDCCH, according to resource block group sizes or numbers of resource block subsets to which a stand-alone carrier and a carrier segment correspond, bandwidths of the stand-alone carrier and the carrier segment and a predetermined indication information format indicating a resource assignment result; and step 1602: deriving the downlink control information assigned to the terminal equipment by the terminal equipment by performing blind detection to the PDCCH;

wherein, the process of deriving the downlink control information assigned to the terminal equipment by performing blind detection to the PDCCH is similar to the prior art, which shall not be described herein any further;

step 1603: determining a resource assignment type by the terminal equipment according to the first bit of the resource assignment domain in the downlink control information, and performing decoding according to the indication information format to which the determined resource assignment type corresponds, so as to obtain the resource assignment result.

The object of determining a resource assignment type is that as the numbers of bit of the resource assignment type 0 and the resource assignment type 1 are equal, decoding can only be performed according to a format to which a resource assignment type corresponds after the type is determined.

In this embodiment, before step 1601, the method further includes a step: determining resource block group sizes or numbers of resource block subsets to which the stand-alone carrier and the carrier segment correspond, according to the bandwidth of the stand-alone carrier or the bandwidths of the stand-alone carrier and the carrier segment and corresponding relationship between a bandwidth and a resource block group size. Wherein, the methods for determination are similar to those of embodiments 1 and 2, which shall not be described herein any further.

In this embodiment, in step 1601, in determining the resource block group sizes or the numbers of resource block subsets to which the stand-alone carrier and the carrier segment correspond according to the bandwidths of the stand-alone carrier and the carrier segment and the corresponding relationship between a bandwidth and a resource block group size, the indication information format employs a first indication information format respectively indicating the resource assignment results of the stand-alone carrier and the carrier segment, and the number of bit of the RA domain is expressed by a formula:

$$1 + \lceil N_{RB1}^{DL}/P_1 \rceil + \sum_{i=1}^{n} \lceil N_{RBi}^{DL}/P_i \rceil, \text{ or}$$

$$(n+1) + \lceil N_{RB1}^{DL}/P_1 \rceil + \sum_{i=1}^{n} \lceil N_{RBi}^{DL}/P_i \rceil;$$

where, $N_{RB1}^{DL}$ is the bandwidth of the stand-alone carrier, $N_{RBi}^{DL}$ is the bandwidth of the i-th carrier segment, $P_1$ is the resource block group size or the number of a resource block subset of the stand-alone carrier, and $P_i$ is the resource block group size or the number of a resource block subset of the i-th carrier segment, wherein i is an integer from 1 to n, n being a positive integer.

In this embodiment, in determining the number of bit of the above RA domain, a number of bit of the RA domain of the resource assignment type 0 may be determined first, and the numbers of bit of the resource assignment type 1 and the resource assignment type 0 are equal. Therefore, in a case to which FIG. 7A corresponds (i.e. there exists one type), a formula $1+\lceil N_{RB1}^{DL}/P_1 \rceil + \lceil N_{RB2}^{DL}/P_2 \rceil$ is used to calculate the number of bit of the RA domain, and in a case to which FIGS. 7B and 7C correspond (i.e. there exist two types), a formula $2+\lceil N_{RB1}^{DL}/P_1 \rceil + \lceil N_{RB2}^{DL}/P_2 \rceil$ is used to calculate the number of bit of the RA domain.

Furthermore, in this embodiment, in determining the resource block group sizes or the numbers of resource block subsets to which the stand-alone carrier and the carrier segment correspond according to the bandwidth of the stand-alone carrier and the corresponding relationship between a bandwidth and a resource block group size, the indication information format employs a second indication information format integrally indicating the resource assignment results of the stand-alone carrier and the carrier segment, and the number of bit of the RA domain is expressed by a formula:

$$1 + \left\lceil \left( N_{RB1}^{DL} + \sum_{i=1}^{n} N_{RBi}^{DL} \right) / P_1 \right\rceil;$$

where $N_{RB1}^{DL}$ is the bandwidth of the stand-alone carrier, $N_{RBi}^{DL}$ is the bandwidth of the i-th carrier segment, and $P_1$ is the resource block group size or the number of a resource block subset determined according to the stand-alone carrier, wherein i is an integer from 1 to n, n being a positive integer.

It can be seen from above that in detecting the downlink control channel, the terminal equipment may determine a number of bit in the RA domain in the DCI, determine a resource assignment type according to the starting bit of the resource assignment domain in the DCI after deriving the DCI assigned for it by performing blind detection to the PDCCH, and perform corresponding decoding according to the indication information format to which the determined resource assignment type corresponds, so as to obtain the resource assignment result.

In embodiments 4 and 5 below, description shall be given taking a case where there exists 1 carrier segment as an example. And the cases where there exist more than 1 carrier segments are similar to this case, and shall not be enumerated herein.

Embodiment 4

Cases where resource assignment results of a stand-alone carrier and a carrier segment are respectively indicated shall be described below by way of examples.

Figure 17:
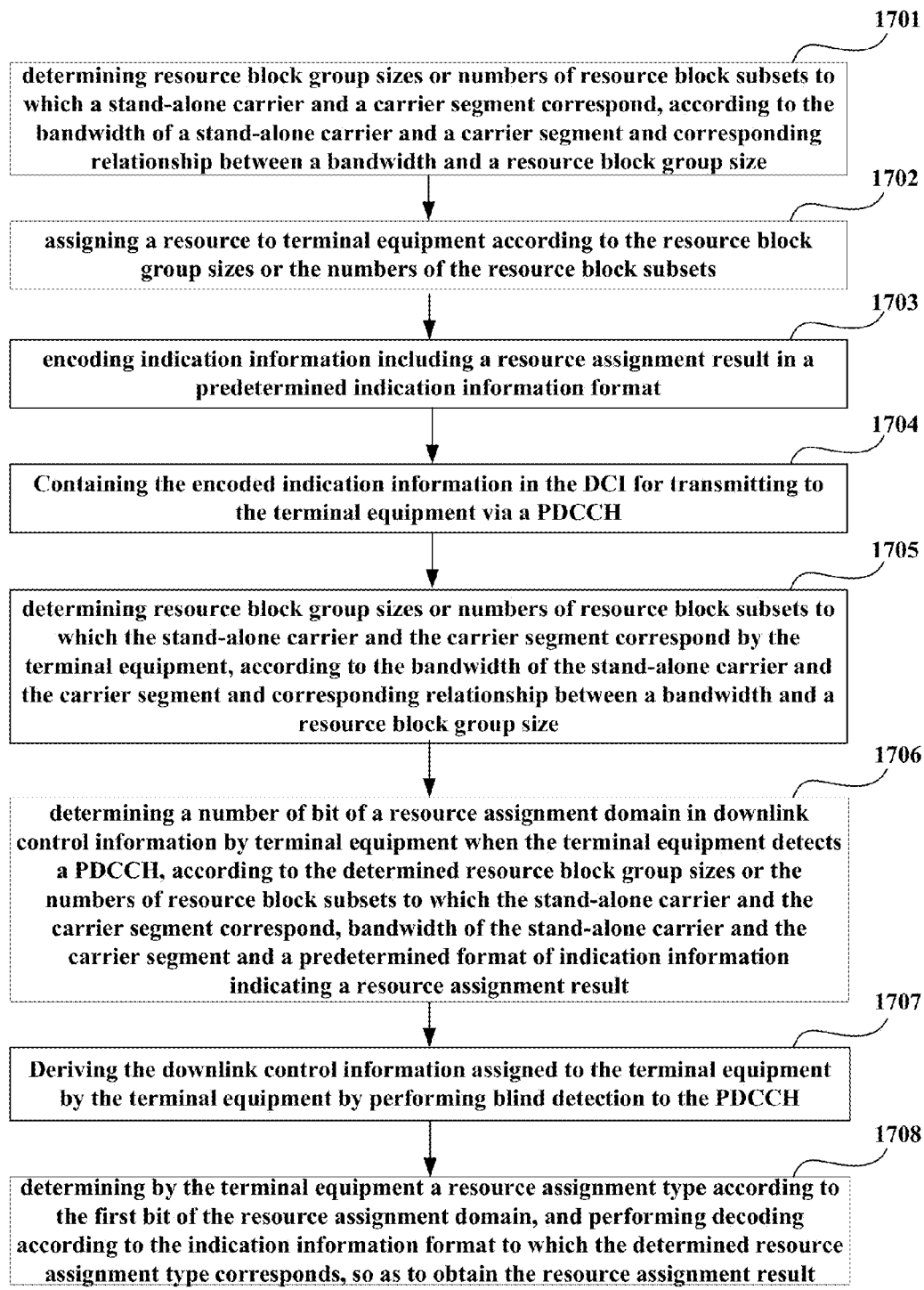
FIG. 17 is a flowchart of the method for resource assignment of Embodiment 4 of the present invention.

FIG. 17 is a flowchart of the method for resource assignment of Embodiment 4 of the present invention. As shown in FIG. 17, the method includes:

at the base station side:

step 1701: determining resource block group sizes or numbers of resource block subsets to which a stand-alone carrier and a carrier segment correspond, according to the bandwidths of a stand-alone carrier and a carrier segment and corresponding relationship between a bandwidth and a resource block group size;

in particular, they may be determined according to the bandwidths of the stand-alone carrier and the carrier segment and the corresponding relationship shown in Table 1, which shall not be described herein any further;

step 1702: assigning a resource to terminal equipment according to the resource block group sizes or the numbers of the resource block subsets; wherein, the manner of assigning a resource may employ any existing manner, such as a maximum carrier to interference scheduling algorithm, or a proportional fairness scheduling algorithm, which shall not be described herein any further;

step 1703: encoding indication information including a resource assignment result in a predetermined indication information format;

wherein, the predetermined indication information format is a first indication information format respectively indicating the resource assignment results of the stand-alone carrier and the carrier segment, such as any one of the indication information formats in Embodiment 1;

step 1704: transmitting the encoded indication information to the terminal equipment;

wherein, the base station may contain the indication information in DCI and transmit the DCI by PDCCH to the terminal equipment.

For example, for the resource assignment type 0, the base station may use the information formats shown in FIGS. 7A-7C for the resource assignment results of the stand-alone carrier and the carrier segment; and for the resource assignment type 1, the base station may use the information formats shown in FIGS. 9A-9E for the resource assignment results of the stand-alone carrier and the carrier segment. Particular resource assignment results and indication information formats shall be described below by way of examples; however, they are embodiments only, and are not limited thereto.

For example, if the bandwidth of the stand-alone carrier is 25 RBs and the bandwidth of the carrier segment is 6 RBs, for the resource assignment type 0, the RBG size of the stand-alone carrier is 2 and the RBG size of the carrier segment is 1; and for the resource assignment type 1, the number of a resource block subset to which the stand-alone carrier corresponds is 2, and the number of a resource block subset to which the carrier segment corresponds is 1.

FIG. 18A is a schematic diagram of assigning a resource by a base station for terminal equipment in this embodiment, and FIG. 18B is a schematic diagram of information indication when the base station uses the format in FIG. 7A. Wherein, in the information on whether each RBG corresponding to the stand-alone carrier is assigned to the terminal equipment in the first row in FIG. 18A, "1" denotes that it is assigned to the terminal equipment, and "0" denotes that it is not assigned to the terminal equipment. And in the information on whether each RBG corresponding to the carrier segment is assigned to the terminal equipment in the second row in FIG. 18A, "1" denotes that it is assigned to the terminal equipment, and "0" denotes that it is not assigned to the terminal equipment. FIGS. 18B and 18C show indication information of corresponding resource assignment results, corresponding respectively to the cases shown in FIGS. 7A and 7B; wherein, "0" denotes the resource assignment type 0. The information format corresponding to FIG. 7C is similar to the above case, which shall not be enumerated herein any further.

For example, in consideration that the carrier bandwidth is less than or equal to 10 RBs, the base station may use the resource assignment type 0 only. Hence, another example is taken into consideration. If the bandwidth of the stand-alone carrier is 25 RBs and the bandwidth of the carrier segment is 15 RBs, for the resource assignment type 0, the RBG size to which the stand-alone carrier correspond is 2 and the RBG size to which the carrier segment correspond is also 2; and for the resource assignment type 1, the number of a resource block subset to which the stand-alone carrier correspond is 2, and the number of a resource block subset to which the carrier segment correspond is also 2.

FIG. 19A is a schematic diagram of assigning a resource by the base station for the terminal equipment in this embodiment. Wherein, in the information on whether each RB in the resource block subset corresponding to the stand-alone carrier is assigned to the terminal equipment in the first row in FIG. 19A, "1" denotes that it is assigned to the terminal equipment, and "0" denotes that it is not assigned to the terminal equipment. And in the information on whether each RB in the resource block subset corresponding to the carrier segment is assigned to the terminal equipment in the second row in FIG. 19A, "1" denotes that it is assigned to the terminal equipment, and "0" denotes that it is not assigned to the terminal equipment.

FIGS. 19B and 19C are schematic diagrams of indication information for the resource assignment result in FIG. 19A corresponding respectively to cases where the resource assignment type 0 uses the format shown in FIG. 7A and the resource assignment type 1 uses the format shown in FIG. 9A or 9B and the resource assignment type 1 indicates that the numbers of bit of the bitmaps of the resource assignment of the stand-alone carrier and the carrier segment may respectively be:

$$\lceil N_{RB1}^{DL}/P_1 \rceil - \lceil \log_2(P_1) \rceil \text{ and } \lceil N_{RB2}^{DL}/P_2 \rceil - \lceil \log_2(P_2) \rceil - 1.$$

FIG. 20A is another schematic diagram of assigning a resource by the base station for the terminal equipment in this embodiment. Wherein, in the information on whether each RB in the resource block subset corresponding to the stand-alone carrier is assigned to the terminal equipment in the first row in FIG. 20A, "1" denotes that it is assigned to the terminal equipment, and "0" denotes that it is not assigned to the terminal equipment. And in the information on whether each RB in the resource block subset corresponding to the carrier segment is assigned to the terminal equipment in the second row in FIG. 20A, "1" denotes that it is assigned to the terminal equipment, and "0" denotes that it is not assigned to the terminal equipment.

FIGS. 20B, 20C and 20D are schematic diagrams of indication information for the resource assignment result in FIG. 20A corresponding respectively to cases where the resource assignment type 0 uses the format shown in FIG. 7A and the resource assignment type 1 uses the format shown in FIGS. 9C, 9D and 9E and the resource assignment type 1 indicates that the numbers of bit of the bitmaps of the resource assignment of the stand-alone carrier and the carrier segment may respectively be:

$$\lceil N_{RB1}^{DL}/P_1\rceil - \lceil \log_2(P_1)-1\rceil \text{ and } \lceil N_{RB2}^{DL}/P_2\rceil - \lceil \log_2(P_2)\rceil - 1.$$

At the terminal equipment side:

step 1705: determining resource block group sizes or numbers of resource block subsets to which the stand-alone carrier and the carrier segment correspond by the terminal equipment, according to the bandwidths of the stand-alone carrier and the carrier segment and corresponding relationship between a bandwidth and a resource block group size;

wherein, for example, if the bandwidth of the stand-alone carrier is 25 RBs and the bandwidth of the carrier segment is 6 RBs, for the resource assignment type 0, the RBG size of the stand-alone carrier is 2 and the RBG size of the carrier segment is 1; and for the resource assignment type 1, the number of a resource block subset to which the stand-alone carrier correspond is 2, and the number of a resource block subset to which the carrier segment correspond is 1;

the method of determination is similar to that in step 1701, and shall not be described herein any further; furthermore, this step may be carried out at the same time with step 1701 by the base station;

step 1706: determining a number of bit of a resource assignment domain in downlink control information by terminal equipment when the terminal equipment detects a PDCCH, according to the determined resource block group sizes or the numbers of resource block subsets to which the stand-alone carrier and the carrier segment correspond, bandwidths of the stand-alone carrier and the carrier segment and a predetermined format of indication information indicating a resource assignment result;

wherein, for example, it is determined according to the resource assignment type 0, and when the indication information is in the information format (containing 1 type) shown in FIG. 14B, the number of bit of the RA domain is expressed by the formula: $1+\lceil N_{RB1}^{DL}/P_1\rceil+\lceil N_{RB2}^{DL}/P_2\rceil$; or, when the indication information is in the information format (containing 2 types) shown in FIGS. 18B and 18C, the number of bit of the RA domain is expressed by the formula: $2+\lceil N_{RB1}^{DL}/P_1\rceil+\lceil N_{RB2}^{DL}/P_2\rceil$;

where, $N_{RB1}^{DL}$ is the bandwidth of the stand-alone carrier, $N_{RB2}^{DL}$ is the bandwidth of the carrier segment, $P_1$ is the RBG size or the number of a resource block subset of the stand-alone carrier, and $P_2$ is the RBG size or the number of a resource block subset of the carrier segment;

step 1707: deriving the downlink control information assigned to the terminal equipment by the terminal equipment by performing blind detection to the PDCCH;

wherein, the process of deriving the downlink control information assigned to the terminal equipment by performing blind detection to the PDCCH is similar to the prior art, which shall not be described herein any further;

step 1708: determining by the terminal equipment a resource assignment type according to the first bit of the resource assignment domain, and performing decoding according to the indication information format to which the determined resource assignment type corresponds, so as to obtain the resource assignment result.

It can be seen from above that after determining the resource block group sizes or numbers of resource block subsets to which a stand-alone carrier and a carrier segment correspond, the base station may assign a resource to terminal equipment according to the determined resource block group sizes or the numbers of the resource block subsets, and notify the resource assignment result to the terminal equipment, thereby avoiding waste of RBs in the resource assignment type 0 on the one hand, and providing a solution for resource assignment of the resource assignment type 1 on the other hand. In detecting the downlink control channel, the terminal equipment may determine a number of bit in the RA domain in the DCI according to the determined resource block group sizes or the numbers of the resource block subsets, the bandwidths of the stand-alone carrier and the carrier segment and the predefined indication information format, determine a resource assignment type according to the starting bit of the resource assignment domain in the DCI after obtaining its DCI, and perform corresponding decoding according to the indication information format to which the determined resource assignment type corresponds, so as to obtain the resource assignment result.

Embodiment 5

Description is given in the above Embodiment 4 taking that the resource assignment results of the stand-alone carrier and the carrier segment are respectively indicated as an example. In this embodiment, a case where the resource assignment results of the stand-alone carrier and the carrier segment as a whole are indicated shall be described.

In this embodiment, at the base station side, what is different from Embodiment 4 is that in step 1701, the base station determines the resource block group sizes or the numbers of resource block subsets to which the stand-alone carrier and the carrier segment correspond according to the bandwidth of the stand-alone carrier and the corresponding relationship between a bandwidth and a resource block group size.

In this embodiment, at the base station side, what is different from Embodiment 4 is that in step 1703, the indication information containing the resource assignment result is encoded in a predefined indication information format; wherein, the predetermined indication information format is a second indication information format integrally indicating the resource assignment results of the stand-alone carrier and the carrier segment, such as any one of the indication information formats in Embodiment 2.

For example, for the resource assignment type 0, the base station may use the indication information format shown in FIG. 12 for the resource assignment results of the stand-alone carrier and the carrier segment.

FIG. 21A is a schematic diagram of assigning a resource by the base station for the terminal equipment in this embodiment, and FIG. 21B is a schematic diagram of information indication when the base station uses the format in FIG. 12; wherein, the stand-alone carrier and the carrier segment are indicated as a whole.

For example, for the resource assignment type 1, the base station may use the indication information format shown in FIG. 13 for the resource assignment results of the stand-alone carrier and the carrier segment.

Figure 22A:
FIG. 22A is a schematic diagram of assigning resources by the base station for the terminal equipment in this embodiment.
Figure 22B:
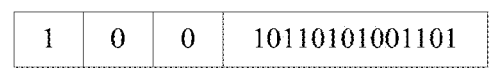
FIG. 22B is a schematic diagram of information indication when the base station uses the format in FIG. 14.

FIG. 22A is a schematic diagram of assigning a resource by the base station for the terminal equipment in this embodiment, and FIG. 22B is a schematic diagram of information indication when the base station uses the format in FIG. 13; wherein, the stand-alone carrier and the carrier segment are indicated as a whole.

In this embodiment, at the terminal equipment side, what is different from Embodiment 4 is that in step 1705, the resource block group sizes or the numbers of resource block subsets to which the stand-alone carrier and the carrier segment correspond are determined according only to the bandwidth of the stand-alone carrier and the corresponding relationship between a bandwidth and a resource block group size.

In this embodiment, at the terminal equipment side, in step 1706, for example, if the indication information is in the format shown in FIG. 21B, that is, in a case where the resource assignment results of the stand-alone carrier and the carrier segment are indicated as a whole, the number of bit of the RA domain is expressed as:

$1+\lceil(N_{RB1}^{DL}+N_{RB2}^{DL})/P_1\rceil$; where, $N_{RB1}^{DL}$ is the bandwidth of the stand-alone carrier, $N_{RB2}^{DL}$ is the bandwidth of the carrier segment, and $P_1$ is the RBG size or the number of a resource block subset determined according to the stand-alone carrier.

Furthermore, in this embodiment, other steps are similar to those in Embodiment 4, and shall not be described herein any further.

An embodiment of the present invention further provides a base station and terminal equipment, as described in embodiments 6 and 7 below. As the principles of the base station and the terminal equipment for solving problem are similar to those of the methods for resource assignment based on a base station and terminal equipment, the implementation of the methods may be referred to for the implementation of the base station and the terminal equipment, and the repeated parts shall not be described any further.

Embodiment 6

Figure 23:
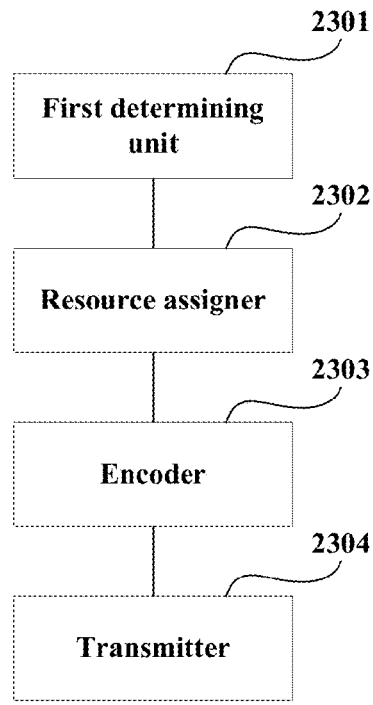
FIG. 23 is a schematic diagram of the structure of the base station of Embodiment 6 of the present invention.

FIG. 23 is a schematic diagram of the structure of the base station of Embodiment 6 of the present invention. As shown in FIG. 23, the base station includes a first determining unit 2301 and a resource assigner 2302; wherein, the first determining unit 2301 is configured to determine resource block group sizes or numbers of resource block subsets to which a stand-alone carrier and a carrier segment correspond, according to the bandwidth of the stand-alone carrier or the bandwidths of the stand-alone carrier and the carrier segment and corresponding relationship between a bandwidth and a resource block group size;

and the resource assigner 2302 is configured to assign a resource to terminal equipment according to the resource block group sizes or the numbers of the resource block subsets.

Wherein, the particular methods of determination of the first determining unit 2301 is similar to those in embodiments 1-2 and 4-5, and different methods of determination may be used according to the cases where the resource assignment results of the stand-alone carrier and the carrier segment are respectively indicated or the resource assignment results of the stand-alone carrier and the carrier segment are integrally indicated, which shall not be described herein any further.

For example, when the first determining unit 2301 determines the resource block group sizes or the numbers of resource block subsets to which the stand-alone carrier and the carrier segment correspond, according to the bandwidths of the stand-alone carrier and the carrier segment and corresponding relationship between a bandwidth and a resource block group size, the indication information format is a first indication information format respectively indicating the resource assignment result of the stand-alone carrier and the resource assignment result of the carrier segment, as described in Embodiment 1.

For example, when the first determining unit 2301 determines the resource block group sizes or the numbers of resource block subsets to which the stand-alone carrier and the carrier segment correspond, according to the bandwidth of the stand-alone carrier and corresponding relationship between a bandwidth and a resource block group size, the indication information format is a second indication information format integrally indicating the resource assignment results of the stand-alone carrier and the carrier segment, as described in Embodiment 2.

In this embodiment, the base station may further include an encoder 2303 and a transmitter 2304; wherein, the encoder 2303 is configured to encode indication information including a resource assignment result in a predetermined indication information format, and the indication information formats described in embodiments 1-2 may be used, which shall not be described herein any further;

and the transmitter 2304 is configured to notify the encoded indication information to the terminal equipment; wherein, the indication information may be contained in DCI for transmitting to the terminal equipment.

The base station may further include a bit number determining unit (not shown) configured to predetermine a number of bit of the bitmaps of the resource assignment of the stand-alone carrier and the carrier segment according to the indication information format. The particular methods of determination are similar to those of embodiments 1 and 2, which shall not be described herein any further. The base station may further include a storage unit configured to store the number of bit for use by the base station in encoding. Furthermore, the base station may include a notifying unit (not shown) configured to notify the number of bit to the terminal equipment, for use by the terminal equipment in decoding.

It can be seen from above embodiment that after determining the resource block group sizes or numbers of resource block subsets to which the stand-alone carrier and the carrier segment correspond, the base station may assign a resource to terminal equipment according to the determined resource block group sizes or the numbers of the resource block subsets to which the stand-alone carrier and the carrier segment correspond, and notify the resource assignment result to the terminal equipment, thereby avoiding waste of RBs in the resource assignment type 0 on the one hand, and providing a solution for resource assignment of the resource assignment type 1 on the other hand.

Embodiment 7

Figure 24:
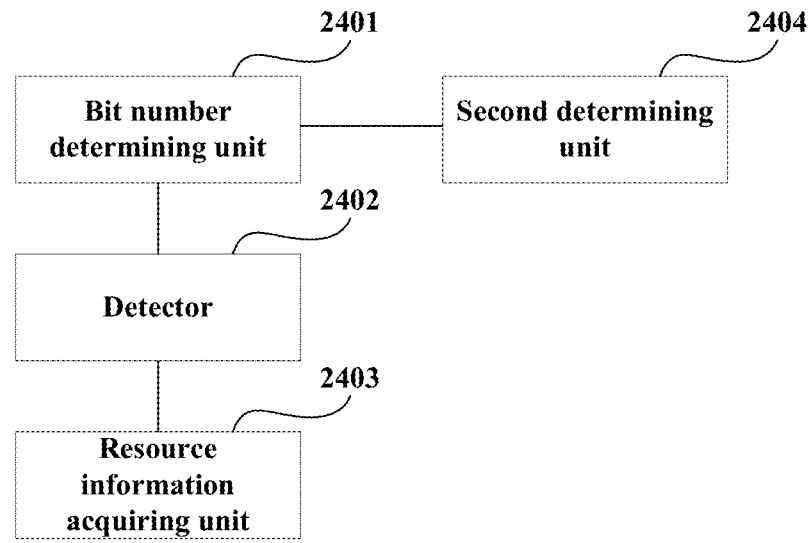
FIG. 24 is a schematic diagram of the structure of the terminal equipment of Embodiment 7 of the present invention.

FIG. 24 is a schematic diagram of the structure of the terminal equipment of Embodiment 7 of the present invention. As shown in FIG. 24, the terminal equipment includes: a bit number determining unit 2401, a detector 2402 and a resource information acquiring unit 2403; wherein, the bit number determining unit 2401 is configured to determine a number of bit of a resource assignment domain in downlink control information according to resource block group sizes or numbers of resource block subsets to which a determined stand-alone carrier and a carrier segment correspond, bandwidths of the stand-alone carrier and the carrier segment and a predetermined indication information format indicating a resource assignment result;

wherein, the methods of determining the number of bit of the bit number determining unit 2401 are similar to those of embodiments 3-5, which shall not be described herein any further;

the detector 2402 is configured to perform blind detection to the downlink control channel(PDCCH) to derive the downlink control information assigned to the terminal equipment;

and the resource information acquiring unit 2403 is configured to determine a resource assignment type according to the first bit of the resource assignment domain after the detector 2402 derives the downlink control channel of the terminal equipment, and perform decoding according to the indication information format to which the determined resource assignment type corresponds, so as to obtain the resource assignment result. Wherein, the first bit of the resource assignment domain in the DCI may be learnt in advance.

In this embodiment, the terminal equipment may further include: a second determining unit 2404 configured to determine the resource block group sizes or numbers of resource block subsets to which the stand-alone carrier and the carrier segment correspond, according to the bandwidth of the stand-alone carrier or the bandwidths of the stand-alone carrier and the carrier segment and corresponding relationship between a bandwidth and a resource block group size. Wherein, the manner of determination of the second determining unit 2404 is the same as that of the first determining unit 2301, which shall not be described herein any further.

Furthermore, the terminal equipment may include a receiver (not shown) configured to receive the numbers of bit of the bitmaps of the resource assignment of the stand-alone carrier and the carrier segment transmitted by the base station, for use in decoding. Or, it may further include a determining unit (not shown) configured to determine the numbers of bit of the bitmaps of the resource assignment of the stand-alone carrier and the carrier segment. The methods of determination are as described in embodiments 1 and 2, which shall not be described herein any further.

Figure 25:
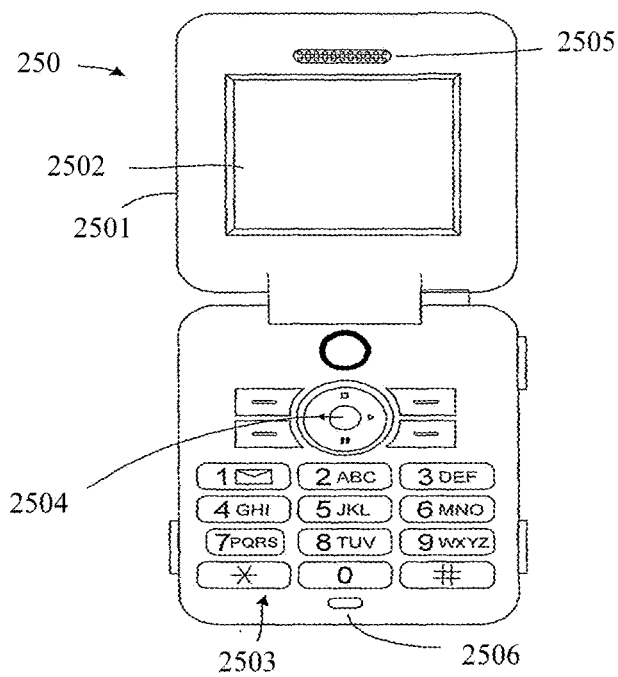
FIG. 25 is a schematic diagram of a mobile phone as an example of the terminal equipment of Embodiment 7 of the present invention.

FIG. 25 is a schematic diagram of a mobile phone as an example of the terminal equipment of Embodiment 7 of the present invention. The terminal equipment of the present invention as shown in FIG. 24 may be used as the mobile phone. Examples of the terminal equipment are not limited to a mobile phone. And the terminal equipment may also be any devices capable of communicating, such as a game player, a PDA, and a portable computer, etc.

As shown in FIG. 25, the mobile phone 250 may be a flip-lid phone having a flip lid 2501 movable between an open position and a closed position. In FIG. 25, the flip lid 2501 is shown as being in the open position. It should understood that the mobile phone 250 may also be of other structures, such as a "bar phone" or a "slide-lip phone" structure.

Besides the units shown in FIG. 23, the mobile phone 250 may further include a display 2502. The display 2502 displays such information to a user as an operational state, time, phone number, telephone directory information, and various menus, etc., so that the user is enabled to use various characteristics of the mobile phone 250. The display 2502 may also be used to visibly display contents received by the mobile phone 250 and/or retrieved from a memory (not shown) of the mobile phone 250. The display 2502 may be used to display images, videos and other graphics to a user, such as photos, mobile TV contents and videos related to games, etc.

A keyboard 2503 provides multiple user input operations. For example, the keyboard 2503 may include an alphanumeric key permitting input of alphanumeric information (such as a phone number, a phone list, telephone directory information, a notebook, and a text, etc.). Furthermore, the keyboard 2503 may include specific functional keys 2504, such as a "call transmit" key to initiate a call or respond a call, and a "call end" key to end or "hang up" a call. The specific functional keys may further comprise a menu navigation key and a selection key on the menu of the display 2502 for convenient navigation. For example, a pointing device and/or a navigation key may be provided to receive directional input from a user. Furthermore, the display 2502 and the keyboard 2503 may be combined in use for carrying out a function of a soft key. The mobile phone 250 may further include parts necessary for carrying out its functions, such as an antenna, a microcontroller, a loudspeaker 2505, and a microphone 2506, etc.

An embodiment of the present invention further provides a computer-readable program, wherein when the program is executed in a base station, the program enables a computer to carry out the method for resource assignment as described in embodiments 1, 2, 4 and 5 in the base station.

An embodiment of the present invention further provides a storage medium in which a computer-readable program is stored, wherein the computer-readable program enables a computer to carry out the method for resource assignment as described in embodiments 1, 2, 4 and 5 in a base station.

An embodiment of the present invention further provides a computer-readable program, wherein when the program is executed in terminal equipment, the program enables a computer to carry out the method for resource assignment as described in embodiments 3-5 in the terminal equipment.

An embodiment of the present invention further provides a storage medium in which a computer-readable program is stored, wherein the computer-readable program enables a computer to carry out the method for resource assignment as described in embodiments 3-5 in terminal equipment.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for encoding a resource allocation result having a standalone carrier and one or more configured carrier segments, the method being performed by a base station in a communication system communicatively connected with at least one terminal equipment, the method comprising:

determining resource block group sizes or numbers of resource block subsets according to a system bandwidth; and encoding the resource allocation result for the stand-alone carrier and the one or more configured carrier segments into an indication information for transmission to the terminal equipment;

wherein the system bandwidth is one of:
the sum of the bandwidth of the standalone carrier and the bandwidth of all the one or more configured carrier segments; and
the bandwidth of the standalone carrier; and wherein the indication information is configured to either:
respectively indicate the resource allocation result for the stand-alone carrier and the resource allocation result for the one or more configured carrier segments; or
integrally indicate the resource allocation result for the stand-alone carrier and the resource allocation result for the configured carrier segments.

2. The method according to claim 1, wherein the method further comprises:
encoding indication information including a resource allocation result in a predetermined indication information format; and
informing the encoded indication information to the terminal equipment.

3. The method according to claim 2, wherein when determining the resource block group sizes or the numbers of the resource block subsets to which the stand-alone carrier and the carrier segment correspond according to the bandwidth of the stand-alone carrier and the carrier segment and corresponding relationship between a bandwidth and a resource block group size, the predetermined indication information format is a first indication information format respectively indicating resource allocation result for the stand-alone carrier and resource allocation result for the one or more configured carrier segments.

4. The method according to claim 3, wherein when the first indication information format is used, a resource allocation type is resource allocation type 0, the number of the carrier segment is 1 or more, and the indication information includes the resource allocation type, information on whether each resource block group of 1 or more stand-alone carriers is assigned to the terminal equipment and information on whether each resource block group of the carrier segment is assigned to the terminal equipment; and
wherein the number of the resource allocation type is 1 or more, and the resource allocation types are identical or different.

5. The method according to claim 3, wherein when the first indication information format is used, the type of the resource allocation is resource allocation type 1, and the indication information includes a resource allocation type, identification of a resource block subset of the stand-alone carrier and a resource block subset of the carrier segment, indication identification of the bit for resource allocation starting from the left side or the right side of a resource block subset, information on whether a corresponding resource block in the resource block subset of the stand-alone carrier is assigned to the terminal equipment and information on whether a corresponding resource block in the resource block subset of the carrier segment is assigned to the terminal equipment.

6. The method according to claim 5, wherein the indication identification of the bit for resource allocation starting from the left side or the right side of the resource block subset comprises indication identification of the bit for resource allocation of the stand-alone carrier starting from the left side or the right side of the resource block subset and indication identification of the bit for resource allocation of the carrier segment starting from the left side or the right side of the resource block subset.

7. The method according to claim 5, wherein,
the information on whether a corresponding resource block in the resource block subset of the stand-alone carrier is assigned to the terminal equipment and the information on whether a corresponding resource block in the resource block subset of the carrier segment is assigned to the terminal equipment are expressed in a manner of bit mapping of resource allocation;

the number of the carrier segment is n, and when the indication information of the resource allocation type 0 includes 1 resource allocation type, information on whether each resource block group of the stand-alone carrier is assigned to the terminal equipment and information on whether each resource block group of the carrier segment is assigned to the terminal equipment, the numbers of bit for bit mapping of resource allocation of the stand-alone carrier and n carrier segment are calculated by using the following formulae:

$\lceil N_{RB}^{DL}/P \rceil - \lceil \log_2(P) \rceil$ and $\lceil N_{RBk}^{DL}/P_k \rceil - \lceil \log_2(P_k) \rceil - 1$;

wherein when the number of bit for bit mapping of resource allocation of a carrier k is $\lceil N_{RBk}^{DL}/P_k \rceil - \lceil \log_2(P_k) \rceil - 1$, the number of bit for bit mapping of resource allocation of the rest carrier is $\lceil N_{RB}^{DL}/P \rceil - \lceil \log_2(P) \rceil$;

where, the carrier k is one of the stand-alone carrier and n carrier segment, $N_{RBk}^{DL\ k}$ is the bandwidth of the carrier k, $P_k$ is the resource block group size or the number of the resource block subset of the carrier k, $N_{RB}^{DL}$ is the bandwidth of the rest carrier, P is the resource block group size or the number of the resource block subset of the rest carrier, and n is a positive integer.

8. The method according to claim 5, wherein the information on whether a corresponding resource block in the resource block subset of the stand-alone carrier is assigned to the terminal equipment and the information on whether a corresponding resource block in the resource block subset of the carrier segment is assigned to the terminal equipment are expressed in a manner of bit mapping of resource allocation;

the number of the carrier segment is n, and when the indication information of the resource allocation type 0 includes a first resource allocation type and information on whether each resource block group of the stand-alone carrier is assigned to the terminal equipment as well as n second resource allocation type and information on whether each resource block group of corresponding n carrier segment is assigned to the terminal equipment, the values of the number of bit for bit mapping of resource allocation of the stand-alone carrier and n carrier segment are taken by using the following formula:

$\lceil N_{RB}^{DL}/P \rceil - \lceil \log_2(P) \rceil$ where, $N_{RB}^{DL}$ is the bandwidth of the corresponding carrier, and P is the resource block group size or the number of the resource block subset of the corresponding carrier.

9. The method according to claim 2, wherein when determining the resource block group sizes to which the stand-alone carrier and the carrier segment correspond, or the numbers of the resource block subsets, to which the stand-alone carrier and the carrier segment correspond according to the bandwidth of the stand-alone carrier and corresponding relationship between a bandwidth and a resource block group size, the predetermined indication information format is a second indication information format integrally indicating the resource allocation result for the stand-alone carrier and the resource allocation result for the one or more configured carrier segments.

10. The method according to claim 9, wherein when the second indication information format is used, a resource allocation type is resource allocation type 0, and the indication information includes the resource allocation type, information on whether each resource block group of the stand-alone carrier and the carrier segment as a whole is assigned to the terminal equipment.

11. The method according to claim 10, wherein the information on whether each resource block group of the stand-alone carrier and the carrier segment as a whole is assigned to the terminal equipment is expressed in a manner of bit mapping of resource allocation;
the number of the carrier segment is n, and the number of bit is:

$$\left\lceil \left( N_{RB1}^{DL} + \sum_{i=1}^{n} N_{RBi}^{DL} \right) \Big/ P_1 \right\rceil;$$

where, $N_{RB1}^{DL}$ is the bandwidth of the stand-alone carrier, $N_{RBi}^{DL}$ is the bandwidth of the i-th carrier segment, and $P_1$ is the resource block group size or the number of the resource block subset determined according to the stand-alone carrier, where, i is an integer from 1 to n, and n is a positive integer.

12. The method according to claim 9, wherein when the second indication information format is used, a resource allocation type is resource allocation type 1, and the indication information includes the resource allocation type, selected identification of the resource block subset, indication identification of the bit for resource allocation starting from the left side or the right side of the resource block subset, and information on whether a corresponding resource block in the resource block subset of the stand-alone carrier and the carrier segment as a whole is assigned to the terminal equipment.

13. The method according to claim 12, wherein the information on whether each resource block subset of the stand-alone carrier and the carrier segment as a whole is assigned to the terminal equipment is expressed in a manner of bit mapping of resource allocation;
the number of the carrier segment is n, and the number of bit is:

$$\left\lceil \left( N_{RB1}^{DL} + \sum_{i=1}^{n} N_{RBi}^{DL} \right) \Big/ P_1 \right\rceil - \lceil \log_2 P_1 \rceil - 1;$$

where, $N_{RB1}^{DL}$ is the bandwidth of the stand-alone carrier, $N_{RBi}^{DL}$ is the bandwidth of the i-th carrier segment, and $P_1$ is the resource block group size or the number of the resource block subset determined according to the stand-alone carrier, where, i is an integer from 1 to n, and n is a positive integer.

14. A base station in a communication system communicatively connected with at least one terminal equipment, said base station configured for encoding a resource allocation result having a standalone carrier and one or more configured carrier segments, the base station comprising:
a memory that stores a plurality of instructions; and
a processor coupled to the memory and configured to execute the instructions to:

determine resource block group sizes or numbers of resource block subsets according to a system bandwidth; and
encode the resource allocation result for the stand-alone carrier and the one or more configured carrier segments into an indication information for transmission to the terminal equipment;
wherein the system bandwidth is one of:
the sum of the bandwidth of the standalone carrier and the bandwidth of all the one or more configured carrier segments; and
the bandwidth of the standalone carrier; and
wherein the indication information is configured to either:
respectively indicate the resource allocation result for the stand-alone carrier and the resource allocation result for the one or more configured carrier segments; or
integrally indicate the resource allocation result for the stand-alone carrier and the resource allocation result for the configured carrier segments.

15. The base station according to claim 14, wherein the processor further executes the instructions to:
encode indication information including a resource allocation result in a predetermined indication information format; and
notify the encoded indication information to the terminal equipment.

16. The base station according to claim 15, wherein when the processor determines the resource block group sizes or the numbers of the resource block subsets to which the stand-alone carrier and the carrier segment correspond according to the bandwidths of the stand-alone carrier and the carrier segment and corresponding relationship between a bandwidth and a resource block group size, the format of the indication information is a first indication information format respectively indicating the resource allocation result for the stand-alone carrier and the resource allocation result for the one or more configured carrier segments; and
when the processor determines the resource block group sizes or the numbers of the resource block subsets to which the stand-alone carrier and the carrier segment correspond according to the bandwidth of the stand-alone carrier and corresponding relationship between a bandwidth and a resource block group size, the format of the indication information is a second indication information format integrally indicating the resource allocation result for the stand-alone carrier and the resource allocation result for the one or more configured carrier segments.

17. Terminal equipment in a communication system communicatively connected with a base station, said base station configured for encoding a resource allocation result having a standalone carrier and one or more configured carrier segments, the terminal equipment comprising:
a memory that stores a plurality of instructions; and
a processor coupled to the memory and configured to execute the instructions to:
determine a number of bits of a resource allocation domain in downlink control information according to determined resource block group sizes or numbers of resource block subsets, bandwidths of the stand-alone carrier and the one or more configured carrier segments and a predetermined indication information format indicating a resource allocation result received from said base station;

perform blind detection to the downlink control channel to derive the downlink control information assigned to the terminal equipment; and determine a resource allocation type according to the first bit of the resource allocation domain after the detector derives the downlink control information assigned to the terminal equipment, and perform decoding according to the indication information format to which the determined resource allocation type corresponds, so as to obtain the resource allocation result wherein the indication information is configured to either:

respectively indicate the resource allocation result for the stand-alone carrier and the resource allocation result for the one or more configured carrier segments; or integrally indicate the resource allocation result for the stand-alone carrier and the resource allocation result for the one or more configured carrier segments.

18. The terminal equipment according to claim 17, wherein the processor is configured to execute the instructions to:

determine the resource block group sizes or numbers of resource block subsets according to the system bandwidth, wherein the system bandwidth is one of:

the sum of the bandwidth of the standalone carrier and the bandwidth of all the one or more configured carrier segments; and the bandwidth of the standalone carrier.

19. The terminal equipment according to claim 17, wherein the number of the carrier segment is n, when a first indication information format respectively indicating the resource allocation result for the stand-alone carrier and the resource allocation result for the one or more configured carrier segments is used as the indication information format, the bit number determining unit determines the number of bits of the resource allocation domain by using the following formula:

$$1 + \lceil N_{RB1}^{DL} / P_1 \rceil + \sum_{i=1}^{n} \lceil N_{RBi}^{DL} / P_i \rceil, \text{ or}$$

$$(n+1) + \lceil N_{RB1}^{DL} / P_1 \rceil + \sum_{i=1}^{n} \lceil N_{RBi}^{DL} / P_i \rceil;$$

where, $N_{RB1}^{DL}$ is the bandwidth of the stand-alone carrier, $N_{RBi}^{DL}$ is the bandwidth of the $i^{th}$ carrier segment, $P_1$ is the resource block group size or the number of the resource block subset of the stand-alone carrier, and $P_i$ is the resource block group size or the number of the resource block subset of the $i^{th}$ carrier segment, where, i is an integer from 1 to n, and n is a positive integer.

20. The terminal equipment according to claim 17, wherein when a second indication information format integrally indicating the resource allocation result for the stand-alone carrier and the resource allocation result for the one or more configured carrier segments is used as the indication information format, the bit number determining unit determines the number of bit of the resource allocation domain by using the following formula:

$$1 + \left\lceil \left( N_{RB1}^{DL} + \sum_{i=1}^{n} N_{RBi}^{DL} \right) / P_1 \right\rceil;$$

where $N_{RB1}^{DL}$ is the bandwidth of the stand-alone carrier, $N_{RBi}^{DL}$ is the bandwidth of the $i^{th}$ carrier segment, and $P_1$ is the resource block group size or the number of the resource block subset determined according to the stand-alone carrier, where, i is an integer from 1 to n, and n is a positive integer.

* * * * *